United States Patent
Tiirola et al.

(10) Patent No.: US 12,557,081 B2
(45) Date of Patent: Feb. 17, 2026

(54) ENABLING FAST DOWNLOAD (DL) SIGNALING FOR GRAND-CHILD-NODE(S) IN THE NEW RADIO UNLICENSED (NR-U) INTEGRATED ACCESS AND BACKHAUL (IAB) DEPLOYMENT

(71) Applicant: NOKIA TECHNOLOGIES OY, Espoo (FI)

(72) Inventors: Esa Tapani Tiirola, Oulu (FI); Kari Juhani Hooli, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 328 days.

(21) Appl. No.: 18/256,386

(22) PCT Filed: Dec. 21, 2021

(86) PCT No.: PCT/EP2021/086954
§ 371 (c)(1),
(2) Date: Jun. 7, 2023

(87) PCT Pub. No.: WO2022/136352
PCT Pub. Date: Jun. 30, 2022

(65) Prior Publication Data
US 2024/0023075 A1    Jan. 18, 2024

Related U.S. Application Data

(60) Provisional application No. 63/199,387, filed on Dec. 22, 2020.

(51) Int. Cl.
*H04W 74/0808* (2024.01)
*H04B 7/155* (2006.01)
*H04W 72/0446* (2023.01)

(52) U.S. Cl.
CPC .... *H04W 72/0446* (2013.01); *H04B 7/15542* (2013.01)

(58) Field of Classification Search
CPC .......... H04W 72/0446; H04W 74/0808; H04B 7/15542
(Continued)

(56) References Cited

U.S. PATENT DOCUMENTS

2019/0305923 A1* 10/2019 Luo ........................ H04W 72/20
2020/0146025 A1*  5/2020 Choi ..................... H04W 72/56
(Continued)

FOREIGN PATENT DOCUMENTS

WO    2020/114588 A1    6/2020
WO     2020125992 A1    6/2020

OTHER PUBLICATIONS

International Search Report and Written Opinion for International Application No. PCT/EP2021/086954, mailed on Jul. 13, 2022, 20 pages.
(Continued)

*Primary Examiner* — Ayman A Abaza
*Assistant Examiner* — Tracy L Williams
(74) *Attorney, Agent, or Firm* — Carter, DeLuca & Farrell LLP

(57) ABSTRACT

Various techniques are provided for method including determining, by a first node, a time domain timing structure that supports bi-directional communication, initiating a communication from the first node to a second node based on the timing structure, sending an indication from the first node to the second node, the indication being configured to cause a time gap in the timing structure and the indication indicates that the time gap is followed by communicating a number of symbols, during which the first node continues to transmit to any device other than the second node, generating the time
(Continued)

gap in the timing structure, and continuing the timing structure by the first node.

1 Claim, 16 Drawing Sheets

(58) Field of Classification Search
USPC .......................................................... 370/336
See application file for complete search history.

(56) References Cited

U.S. PATENT DOCUMENTS

| | | | | |
|---|---|---|---|---|
| 2020/0280993 | A1* | 9/2020 | Zhuo | ........................ H04W 8/24 |
| 2020/0396767 | A1 | 12/2020 | Talarico et al. | |
| 2021/0345406 | A1* | 11/2021 | Myung | ................. H04L 5/0094 |
| 2021/0352688 | A1* | 11/2021 | Luo | ................... H04W 72/1268 |
| 2021/0378010 | A1* | 12/2021 | Luo | ........................ H04W 16/14 |
| 2021/0400720 | A1* | 12/2021 | Luo | ................... H04W 74/0816 |

OTHER PUBLICATIONS

"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.

"3rd Generation Partnership Project; Technical Specification Group Radio Access Network; Physical layer procedures for shared spectrum channel access (Release 16)", 3GPP TS 37.213, V16.3.0, Sep. 2020, pp. 1-26.

"5 GHz RLAN; Harmonised Standard covering the essential requirements of article 3.2 of Directive 2014/53/EU", ETSI EN 301 893, V2.1.1, May 2017, pp. 1-122.

Notice of Allowance received for corresponding European Patent Application No. 21843938.8, dated Jun. 19, 2024, 8 pages.

* cited by examiner

FIG. 5B

ENABLING FAST DOWNLOAD (DL) SIGNALING FOR GRAND-CHILD-NODE(S) IN THE NEW RADIO UNLICENSED (NR-U) INTEGRATED ACCESS AND BACKHAUL (IAB) DEPLOYMENT

CROSS-REFERENCE TO RELATED APPLICATIONS

This application is a national stage entry of International Application No. PCT/EP2021/086954, filed Dec. 21, 2021, entitled "ENABLING FAST DOWNLOAD (DL) SIGNALING FOR GRAND-CHILD-NODE(S) IN THE NEW RADIO UNLICENSED (NR-U) INTEGRATED ACCESS AND BACKHAUL (IAB) DEPLOYMENT" which claims the benefit of priority of U.S. Provisional Application No. 63/199,387, filed Dec. 22, 2020, both of which are hereby incorporated by reference in their entireties.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UNITS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

In a general aspect, a device, a system, a non-transitory computer-readable medium (having stored thereon computer executable program code which can be executed on a computer system), and/or a method can perform a process with a method including determining, by a first node, a time domain timing structure that supports bi-directional communication, initiating a communication from the first node to a second node based on the timing structure, sending an indication from the first node to the second node, the indication being configured to cause a time gap in the timing structure and the indication indicates that the time gap is followed by communicating a number of symbols, during which the first node continues to transmit to any device other than the second node, generating the time gap in the timing structure, and continuing the timing structure by the first node.

Implementations can include one or more of the following features. For example, the first node can be a parent node, the second node can be a child node, and the third node can be a grand-child node. The second node can be an IAB node. During the communication of the number of symbols, a first node transmission can be restricted to a subset of frequency domain resources. The third node can be a user equipment or an IAB node. The first node, the second node, and the third node can be configured to operate in an unlicensed frequency band. The time domain timing structure can be a channel occupancy time structure. The time domain timing structure can include at least a first pattern and a second pattern, the first pattern can include a first number of portions allocated to at least one of an uplink transmission and a downlink transmission, the first pattern can be associated with a first link category, the second pattern can include a second number of portions allocated to at least one of an uplink transmission, and a downlink transmission, and the second pattern can be associated with a second link category. The steps can occur during one pattern. The indication can identify the time gap in the timing structure. The time gap can be a listen before talk (LBT) time gap. The time gap can be 25 µs. The indication further indicates time domain resources allocated for the second node, and the resources can be used for transmitting a second indication after the time gap. The steps further comprising communicating a signal from the first node to the device via the second node.

In another general aspect, a device, a system, a non-transitory computer-readable medium (having stored thereon computer executable program code which can be executed on a computer system), and/or a method can perform a process with a method including determining, by a first node, a time domain timing structure that supports bi-directional communication, monitoring control messages via one of a downlink channel or a physical downlink control channel (PDCCH), detecting, by the first node, a download burst communication from a second node, receiving a downlink signal by the first node from the second node, receiving an indication by the first node, from the second node, the indication being configured to cause a time gap in the timing structure, and communicating by the first node, to a third node during a number of symbols following the time gap in the timing structure.

Implementations can include one or more of the following features. For example, the first node can be a child node, the second node can be a parent node, and the third node can be a grand-child node. The first node and the third node can comprise distributed units. The first node and the third node can be integrated access and backhaul nodes. The third node can be a mobile terminal. The third node can be a user equipment. The first node, the second node, and the third node can be configured to operate in an unlicensed frequency band. The time domain timing structure can be a channel occupancy time structure. The time domain timing structure can include at least a first pattern and a second pattern, the first pattern can include a first number of portions allocated to at least one of an uplink transmission and a downlink transmission, the first pattern can be associated with a first link category, the second pattern can include a second number of portions allocated to at least one of an uplink transmission and a downlink transmission, and the second pattern can be associated with a second link category. The indication can identify the time gap in the timing structure. The time gap can be a listen before talk (LBT) time gap. The time gap is 25 μs. The steps can further include receiving, by the first node, from the second node, a communication including the signal.

In yet another general aspect, a device, a system, a non-transitory computer-readable medium (having stored thereon computer executable program code which can be executed on a computer system), and/or a method can perform a process with a method including determining, by a first node, a time domain timing structure that supports bi-directional communication, monitoring control messages via one of a downlink channel or a physical downlink control channel (PDCCH), determining whether the timing structure includes an unoccupied channel, in response to determining the timing structure includes an unoccupied channel, communicating a control signal to a second node via a third node, and terminating the monitoring of the control messages.

Implementations can include one or more of the following features. For example, the first node can be a grand-child node, the second node can be a parent node, and the third node can be a child node. The first node and the third node are distributed units. The first node and the third node can be integrated access and backhaul nodes. The first node can be a mobile terminal. The first node can be a user equipment. The first node, the second node, and the third node can be configured to operate in an unlicensed frequency band. The time domain timing structure can be a channel occupancy time structure. The time domain timing structure can include at least a first pattern and a second pattern, the first pattern can include a first number of portions allocated to at least one of an uplink transmission and a downlink transmission, the first pattern can be associated with a first link category, the second pattern can include a second number of portions allocated to at least one of an uplink transmission and a downlink transmission, and the second pattern can be associated with a second link category. The determining of whether the timing structure can include an unoccupied channel uses a listen before talk (LBT) technique.

The details of one or more examples of embodiments are set forth in the accompanying drawings and the description below. Other features will be apparent from the description and drawings, and from the claims.

BRIEF DESCRIPTION OF THE DRAWINGS

FIGS. 5A and 5B illustrate example embodiments of a multi-hop scenario according to at least one example embodiment.

DETAILED DESCRIPTION

Figure 1:
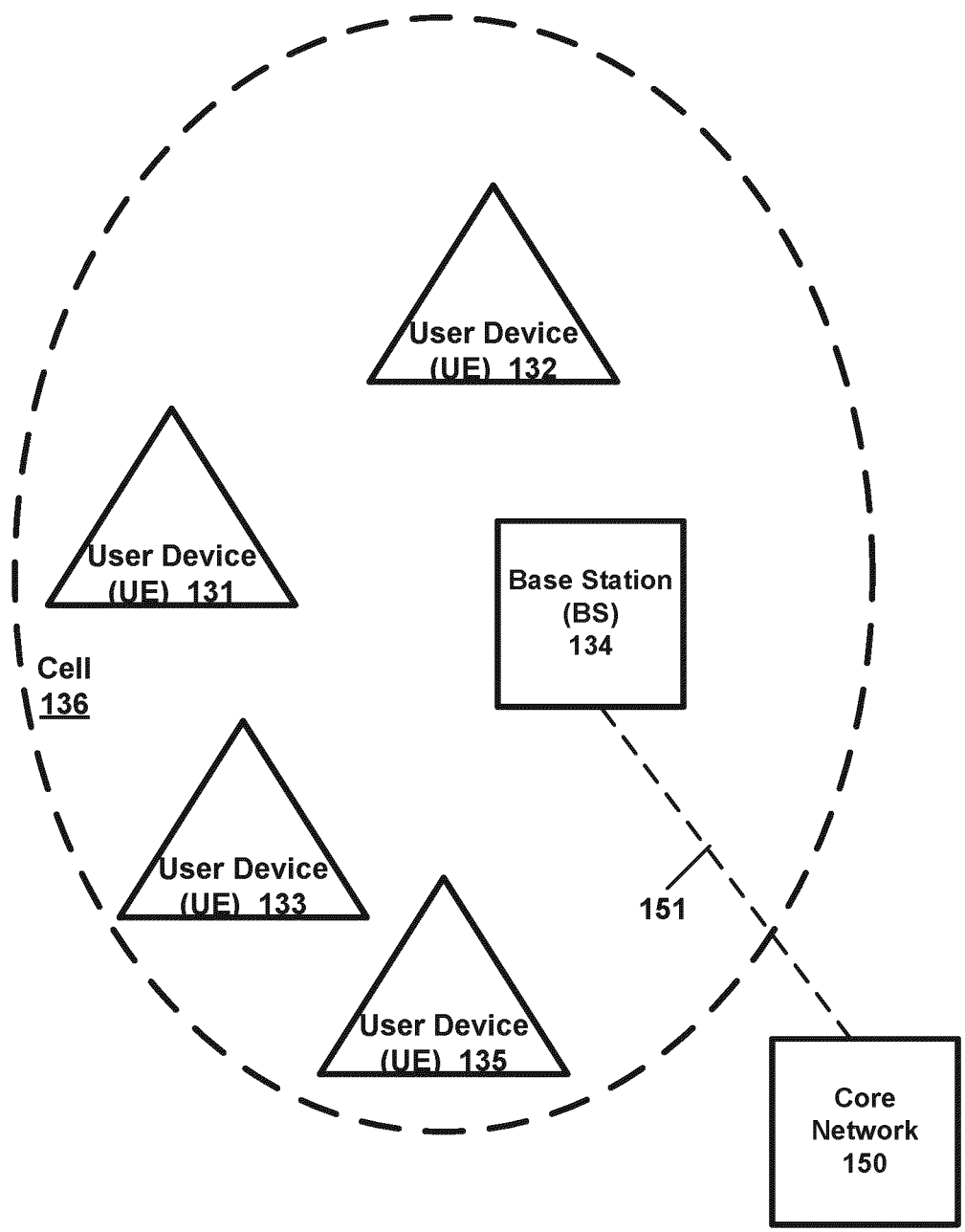
FIG. 1 is a block diagram of a wireless network according to at least one example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, e.g., such as a centralized unit (CU) and/or a distributed unit (DU) in the case of a split BS. At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node. For example, a BS (or gNB) may include: a distributed unit (DU) network entity, such as a gNB-distributed unit (gNB-DU), and a centralized unit (CU) that may control multiple DUs. In some cases, for example, the centralized unit (CU) may be split or divided into: a control plane entity, such as a gNB-centralized (or central) unit-control plane (gNB-CU-CP), and an user plane entity, such as a gNB-centralized (or central) unit-user plane (gNB-CU-UP). For example, the CU sub-entities (gNB-CU-CP, gNB-CU-UP) may be provided as different logical entities or different software entities (e.g., as separate or distinct software entities, which communicate), which may be running or provided on the same hardware or server, in the cloud, etc., or may be provided on different hardware, systems or servers, e.g., physically separated or running on different systems, hardware or servers.

As noted, in a split configuration of a gNB/BS, the gNB functionality may be split into a DU and a CU. A distributed unit (DU) may provide or establish wireless communications with one or more UEs. Thus, a DUs may provide one or more cells, and may allow UEs to communicate with and/or establish a connection to the DU in order to receive wireless services, such as allowing the UE to send or receive data. A centralized (or central) unit (CU) may provide control functions and/or data-plane functions for one or more connected DUs, e.g., including control functions such as gNB control of transfer of user data, mobility control, radio access network sharing, positioning, session management etc., except those functions allocated exclusively to the DU. CU may control the operation of DUs (e.g., a CU communicates with one or more DUs) over a front-haul (Fs) interface.

According to an illustrative example, in general, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. Base station functionalities may also be carried out by the DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM) (which may be referred to as Universal SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. User device functionalities may also be carried out by the MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network (e.g., which may be referred to as 5GC in 5G/NR).

In addition, by way of illustrative example, the various example embodiments or techniques described herein may be applied to various types of user devices/network nodes (including IAB nodes) or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), massive MTC (mMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5G (New Radio (NR)), cmWave, and/or mmWave band networks, IoT, MTC, eMTC, mMTC, eMBB, URLLC, etc., or any other wireless network or wireless technology. These example networks, technologies or data service types are provided only as illustrative examples.

Figure 2A:
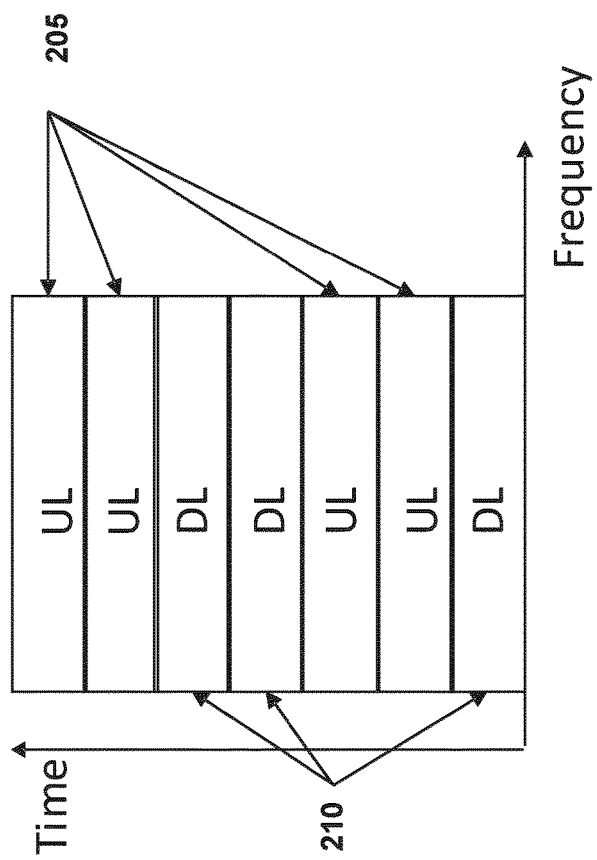
FIGS. 2A and 2B illustrate allocating resources within a communication system according to at least one example embodiment.
Figure 2B:
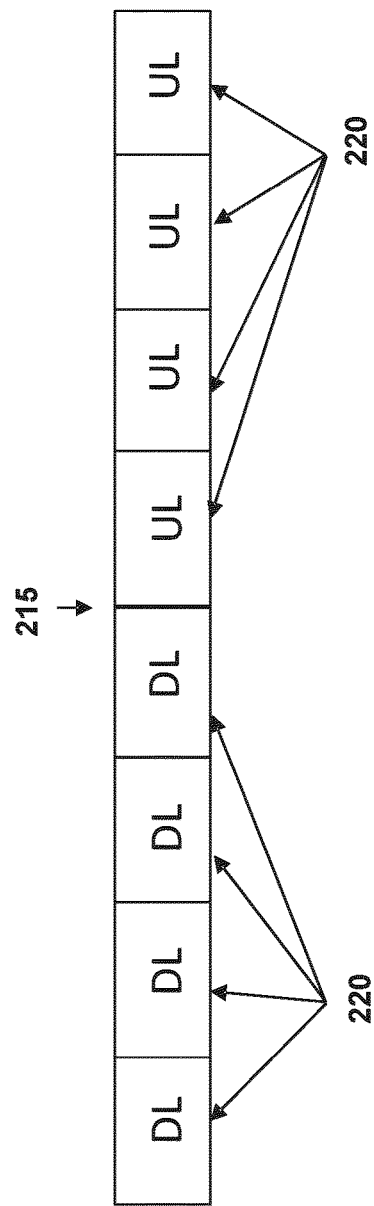

FIGS. 2A and 2B illustrate allocating resources within a communication system according to at least one example embodiment. FIG. 2A illustrates time division duplex (TDD) communication (e.g., between a terminal device and an access node). In TDD, uplink 205 and downlink 210 can be using the same frequency band but are separated by time slots for using the frequency band allocated to them. In other words, while the frequency band is the same for uplink 205 and downlink 210 transmissions, they do not use the frequency band for transmissions simultaneously but are allocated separate time slots for using the frequency band. TDD thereby emulates full duplex communication over a half-duplex communication link. The network nodes may operate according to half-duplex constraint (i.e., they're not capable of simultaneous Tx and Rx). TDD can adapt to a situation in which the data rates of uplink 205 and downlink 210 are asymmetrical. For example, if the amount of data to be transmitted in uplink 205 direction increases, more communication capacity may easily be allocated by dynamically allocating more time slots for uplink 205 transmission.

Correspondingly, if the amount of data to be transmitted in the uplink 205 direction reduces, communication capacity may be freed from the uplink 205 transmission and allocated to downlink 210 transmission. The same applies when the amount of data to be transmitted in downlink 210 direction increases or decreases. Although not explicitly illustrated in FIG. 2A, it is possible to have guard period time slots between adjacent time slots. This may be advantageous if the adjacent time slots are allocated such that the transmission direction changes from uplink 205 to downlink 210 or vice versa. As the uplink 205 and downlink 210 transmissions take place in the same frequency band, TDD is suitable to be used in an unpaired spectrum which can be understood as spectrum that is allocated by the regulators as one block that is to be used for both uplink 205 and downlink 210. To support the bi-directional communication, the time domain resources may need to be allocated.

FIG. 2B illustrates an example partitioning of the time domain resources 215. The partitioning may also be known as a frame structure or it may also be known as channel occupancy time (COT) structure and it may be understood as a timing structure that supports bi-directional communication. The partitioning of the time domain resources may have a fixed overall duration, or the overall duration may vary. The same holds for the starting (and/or ending) time. The partitioning of the time domain resources may operate according to fixed (periodical) frame structure and/or may operate according to floating timing where starting (and/or ending time) of the COT varies (e.g., based on LBT process and/or gNB scheduler operation). Within the time domain resource partitioning 215, there can be portions 220 that each have a duration. The portions 220 can be available to uplink and downlink communication. The time domain resource partitioning 215, which may be understood as the allocation of the portions 220, to be used may be determined by an access node. FIG. 2B shows a single DL-UL cycle. However, example implementations are not limited to such scenario. In other words, the time domain structure can support multiple switching points.

In a cellular communication system, the time domain resource partitioning used by each access node may be the same thereby causing the same time domain resource partitioning to be used in all cells. The portion 220 can include one orthogonal frequency division multiplexing, OFDM symbol. The portion 220 may correspond to a mini-slot, which may include, for example, 7, 4 or 2 OFDM symbols. The portion 220 may correspond to a slot that can include 14 OFDM symbols. The time domain resource partitioning to be used may be fixed and may be modified only in maintenance. The time domain resource partitioning may be modified dynamically by the access node. Dynamic modification of the time domain resource partitioning in a cellular communication system may cause adjacent cells to use two or more time domain resource partitionings that are structured differently from each other. If the time domain resource partitioning is dynamically modified, the transmission direction may be changed between uplink and downlink efficiently and thereby improve utilization of physical resources both in time and frequency domain. This may result in higher throughput and reduced latencies. At the same time, dynamically modifying the time domain resource partitioning may create more challenging interference scenarios. For example, in addition to co-channel interference (DL→DL, UL→UL), the time domain partitioning may cause cross link interference (DL→UL), (UL→DL). This can be mitigated, for example, by proper coordination between adjacent cells. Furthermore, listen before talk (LBT) used in different unlicensed band scenarios (e.g., below 7 GHz bands) can be an efficient technique used to mitigate both co-channel and cross-link interference.

If an access node does not have a wired backhaul connection, the access node may utilize the wireless channel resources to connect to an access node that does have a wired backhaul connection or the access node may connect to another access node and the other access node is then connected to an access node with a wired backhaul connection. The access node may therefore be referred to as an integrated access and backhaul (IAB) node. In some cases relevant for <7 GHz unlicensed band operation, the IAB node may not be capable of simultaneous transmission/reception (this is called as a half-duplex constraint). Another constraint can be where the IAB node cannot serve a backhaul link and an access link at the same time (e.g., due to different symbol timing, and mutual interference). This means that for IAB node (<7 GHz) time division multiplexing is the primary multiplexing scheme between backhaul and access. The access node that does have the wired backhaul connection and to which the IAB node connects to for backhauling, may be referred to as a donor node. In the case of self-backhaul (a.k.a. integrated access and backhaul) the donor node uses the same wireless channel to serve terminal devices that are within a cell provided by the donor access node and to provide a wireless backhaul connection for the IAB node. Out-of-band relaying corresponds to a scenario without access terminal devices in a spectrum where the out-of-band relaying takes place. In some examples, a donor node may also have out-of-band relayed backhaul connection instead of a wired backhaul connection.

By having donor nodes and IAB nodes, the coverage of a communication system may be extended without having to equip all access nodes with a wired backhaul connection. This may be useful if the communication system operates using an unlicensed frequency band, like at or around 6 GHz for example. As the donor node (and/or CU) is configured to have an overall control of the radio resources, coverage extension may be achieved with minimal manual efforts and self-configuration of the communication system may be enabled.

Figure 3:
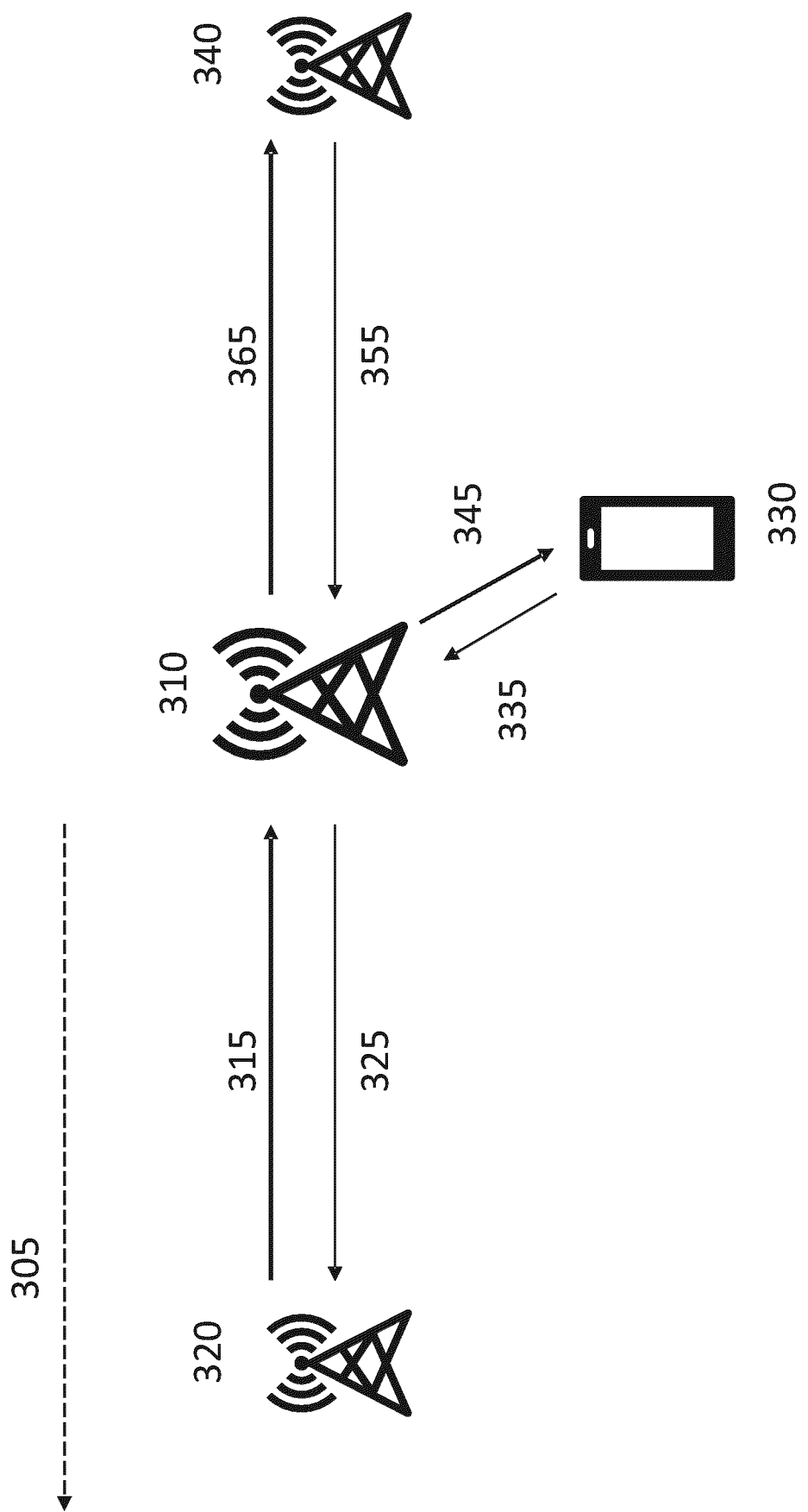
FIG. 3 illustrates links that are to be supported by time domain resources according to at least one example embodiment.

FIG. 3 illustrates links that are to be supported by time domain resources according to at least one example embodiment. FIG. 3 illustrates IAB nodes and links between IAB nodes and access terminal devices that are terminal devices having access links to the IAB node. As shown in FIG. 3 there is a backhaul downlink 315 and a backhaul uplink 325 between and IAB node 310 and a parent node 320 which may be another IAB node. The parent node 320 can provide backhaul links to the IAB node 310. However, may not have a wired backhaul connection itself. Arrow 305 illustrates the direction towards a donor node having a wired backhaul connection. Transmissions between the parent node 320 and the IAB node 310 may be scheduled by the parent node 320. Therefore, the backhaul downlink 315 may also be referred to as a parent backhaul downlink and the backhaul uplink 325 may also be referred to a parent backhaul uplink.

As shown in FIG. 3, there is also link 365 which is a backhaul downlink and link 355 which is a backhaul uplink between the IAB node 310 and another IAB node, that is a child node 340. The IAB node 310 can schedule transmissions between the IAB node 310 and the child node 340. Therefore, the link 365 may be referred to as a child backhaul downlink and the link 355 may also be referred to as a child backhaul uplink. Links 355 and 365 may also be referred to as child links.

As shown in FIG. 3, there is further link 345 which is an access downlink and link 335 which is an access uplink between the IAB node 310 and a terminal device 330. The IAB node 310 can schedule transmissions between the IAB node 310 and the terminal device 330. Therefore, the link 345 may be referred to as a child access downlink and the link 335 may also be referred to as a child access uplink. Links 335 and 345 may be referred to as child links.

The IAB node 310 may include mobile terminal (MT) functionality that facilitates reception of parent backhaul downlink and transmission of parent backhaul uplink. The IAB node 310 may include data unit (DU) functionality which is separate from the MT functionality. The DU functionality can facilitate, for example, transmission of child backhaul downlink and access link and reception of child backhaul uplink and access link.

The backhaul downlink 315 can be facilitated by downlink time resources and the backhaul uplink 325 can be facilitated by uplink time resources. There may further be flexible time resources that facilitate dynamic capacity allocation between downlink and uplink and between parent backhaul links and child links.

In an example implementation of FIG. 3, the child links may have the following resources available: downlink time, uplink time, flexible time and not available time. The not available time resource may not be used for communication on the DU child links. The time resources available for the child links may be categorized as hard or soft. Hard resources are such that corresponding time resource is always available for the DU child link and soft resources are such that availability of the corresponding time resource for the DU child link is explicitly and/or implicitly controlled by the parent node. In some implementations, flexible resources from MT point of view may be soft resources from DU point of view. In some other implementations, DL or UL resources from the MT point of view may be soft resources or NA resources from the DU point of view.

The IAB node 310 can operate according to centralized co-ordination. Alternatively, or in addition, the IAB node 310 can operate according to a distributed co-ordination. In the distributed co-ordination the parent node 320 can be responsible for downlink and uplink scheduling for the parent links using the resources available. The parent node 320 can be responsible for dynamic adaptation of available resources between parent and child links.

A CU may determine a semi-static resource configuration separately for each IAB node. One resource configuration may then cover both MT and DU parts of the IAB node. Alternatively, separate resource configuration can be provided for MT and DU parts of an the IAB node. It may also be possible for available resources to include additional resource types. The parent node can then allocate the available soft resources in the parent backhaul links to facilitate dynamic resource allocation between downlink and uplinks and also between parent and child links.

In order to detect when to start transmitting data, listen before talk (LBT) may be utilized. Using type 1 LBT, a device (e.g., an access node) may generate a random number N uniformly distributed over a contention window. Once the device has measured the channel to be vacant for N times or occasions, the device may acquire the channel with transmission. Using type 2 LBT (e.g., type 2A channel access scheme described in 37.213), a device performs a single channel measurement in time interval of, for example, 25 µs before acquiring the channel for transmission. However, the usage of LBT may cause uncertainty regarding the starting time for channel occupancy time (COT) which may conflict with the co-ordination of the transmitting and receiving phases of the devices. COT may be defined as a time interval when the device acquires the channel, or as a period that device reserves for transmissions. The duration of COT can be bound to be equal or less than a maximum channel occupancy time. The maximum channel occupancy time may be predetermined by regulations or in system specifications. The device initiating the COT may share the COT with other device or devices. In other words, the COT may contain transmissions from the device initiating the COT as well as transmissions sent to the initiating device from other devices. Within the COT there may be one or multiple switching points for the transmission directions controlled by the initiating device. A time domain resources partitioning may be done according to the maximum channel occupancy time.

Example implementations relate to relaying operation at, for example, below the 7 GHz unlicensed band. An example implementation can combine an IAB operation on top of the new radio (NR) framework and unlicensed band operation on top of the NR framework as defined in NR Rel-16. From an enterprise business perspective, unlicensed cells can have limited coverage and IAB may be used to provide a more complete coverage over the whole area of, for example, a private industrial network area (e.g., an industrial complex, a harbour, and the like) in a cost-effective manner.

Channel access mechanisms may need to comply with regulations. Therefore, the channel access mechanisms may need to be adapted for particular frequency ranges. Channel access mechanisms considered, for example, for 5 GHz as well as tentatively for 6 GHz unlicensed NR operation. An LTE-LAA LBT channel access mechanism can be a baseline for 5 GHz band and can be the starting point of the design for 6 GHz band (e.g., per 3GPP TR 38.889). At least for band where absence of Wi-Fi cannot be guaranteed (e.g., by regulation), LBT can be performed in units of 20 MHz. For initiation of a COT by the gNB (operating as an LBE device), type 1 and type 2 (including type 2 A/B/C channel access schemes) channel access schemes can be used. In addition, channel access mechanisms, for example, for 5 GHz as well as tentatively for 6 GHz unlicensed NR operation with IAB, can be the mechanisms or be based on the mechanisms described in 3GPP TS37.213." For example, in 37.213, Type 1 LBT corresponds to Cat 4 LBT, Type 2A/B LBT to Cat 2 LBT and Type 2C LBT to Cat1 LBT. With DRS, Type 2A LBT can be used.

Applicability of an LBT scheme other than type 1 LBT for control messages related to initial/random access, mobility, paging, reference signals only, and PDCCH-only transmissions, e.g., RACH message 4, handover command, GC-PDCCH, or short message paging transmitted either alone or when multiplexed with DRS may be established. Further details related to exceptions may be determined. Within a gNB-initiated COT, an UL burst for a UE consisting of one or more of PUSCH, PUCCH, PRACH, and SRS may follow the type 2 channel access schemes (including type 2 A/B/C channel access schemes as defined for UL) as described in TS37.213. An UL burst can be defined as a set of transmissions from a given UE having no gaps or gaps of, for example, no more than 16 μs. Transmissions from a UE having a gap of more than 16 μs may be considered as separate UL bursts. The number of LBT attempts within a COT may be determined based on a technical specification.

Figure 4A:
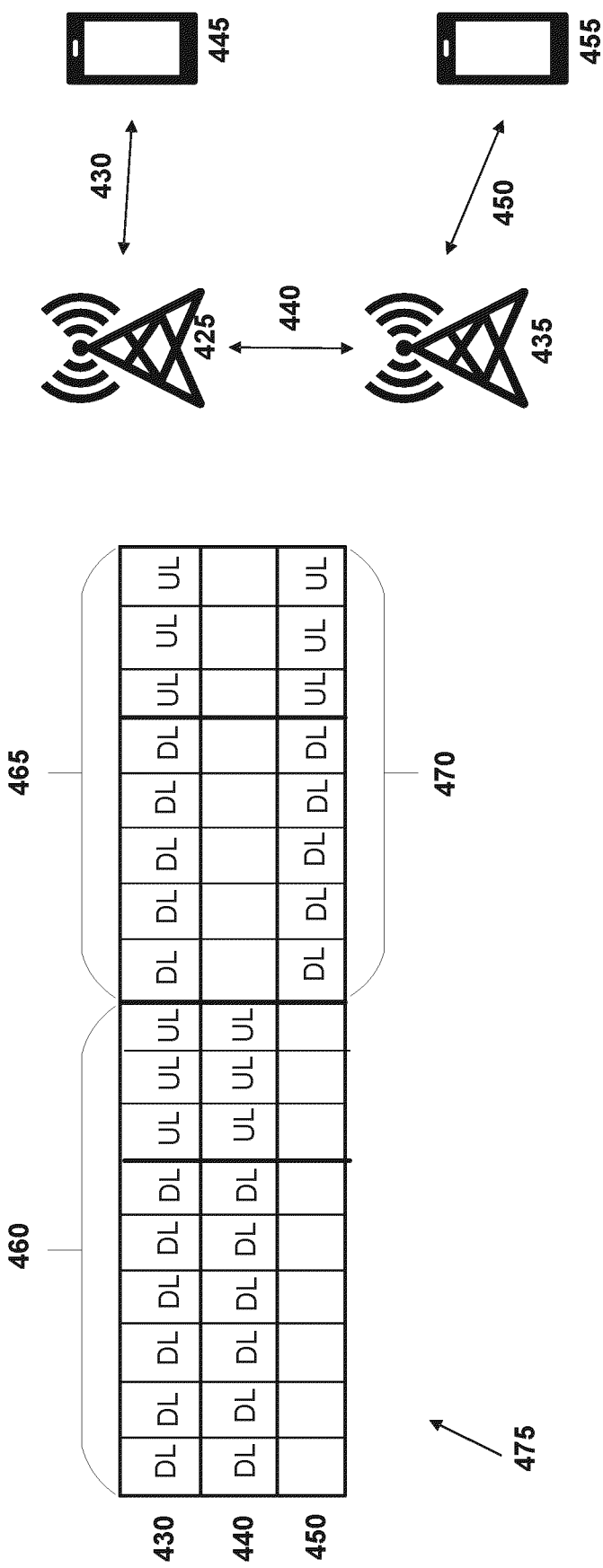
FIGS. 4A and 4B illustrate time domain resource partitioning according to at least one example embodiment.
Figure 4B:
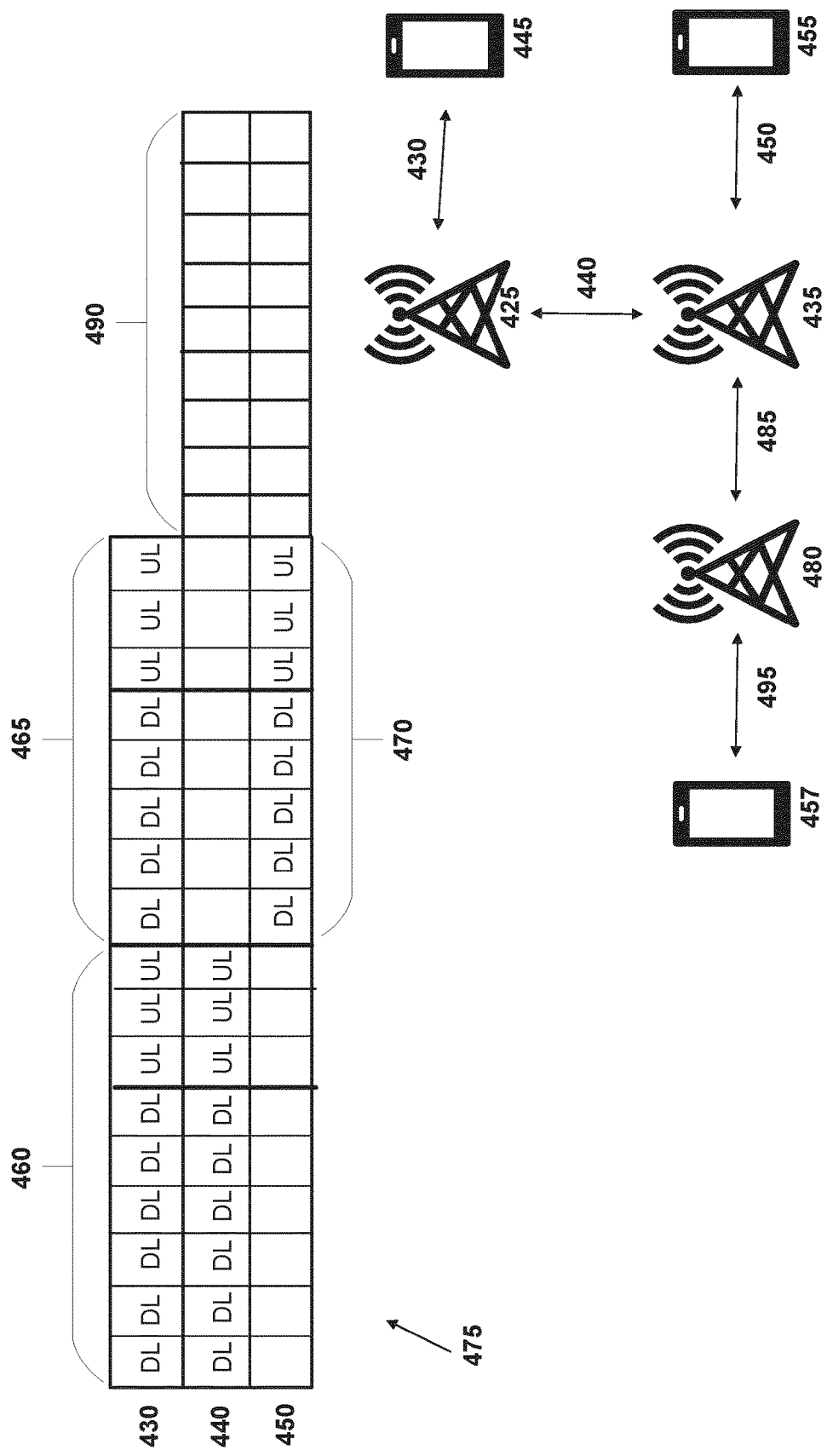
Figure 5A:
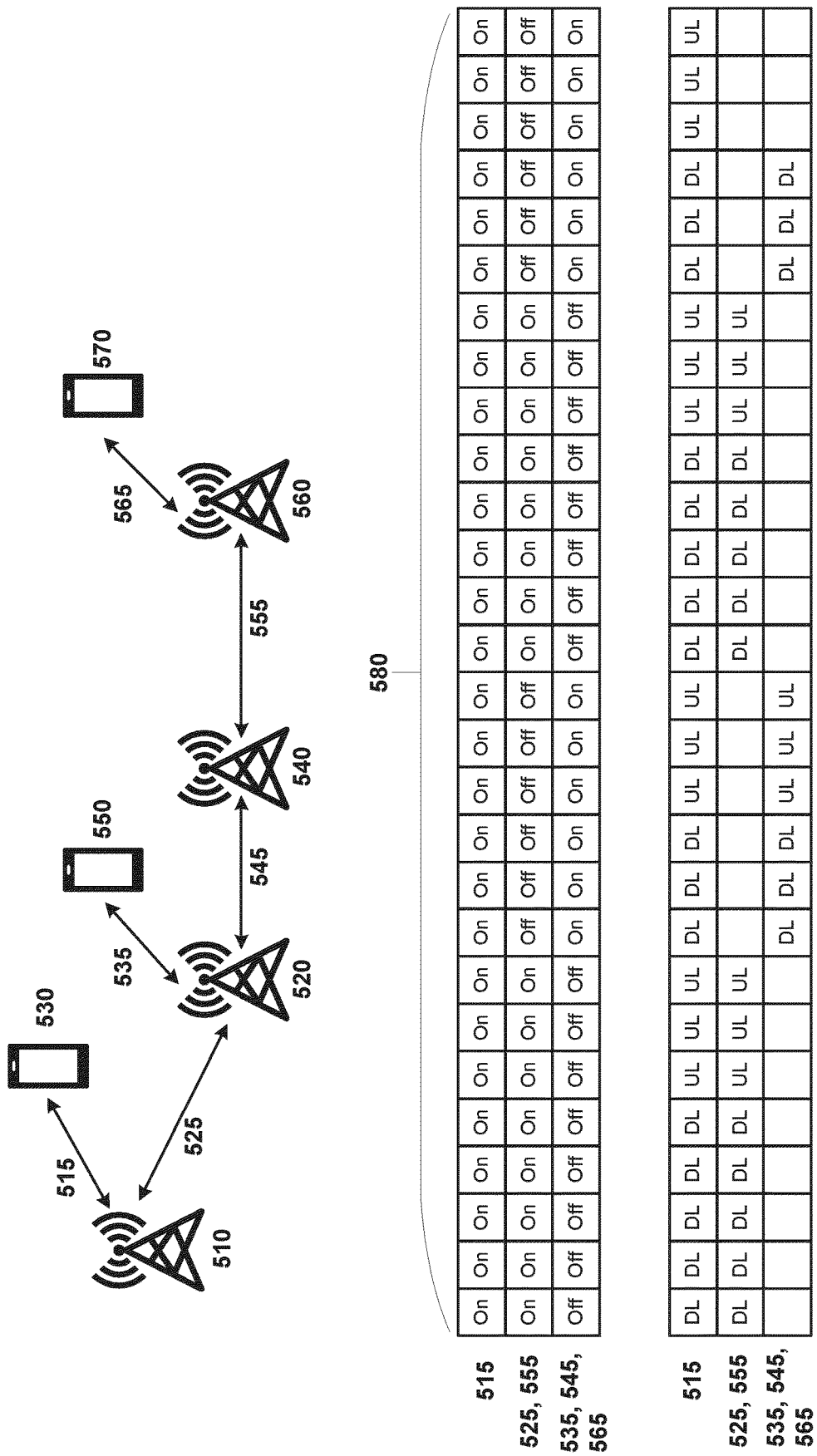
Figure 5B:
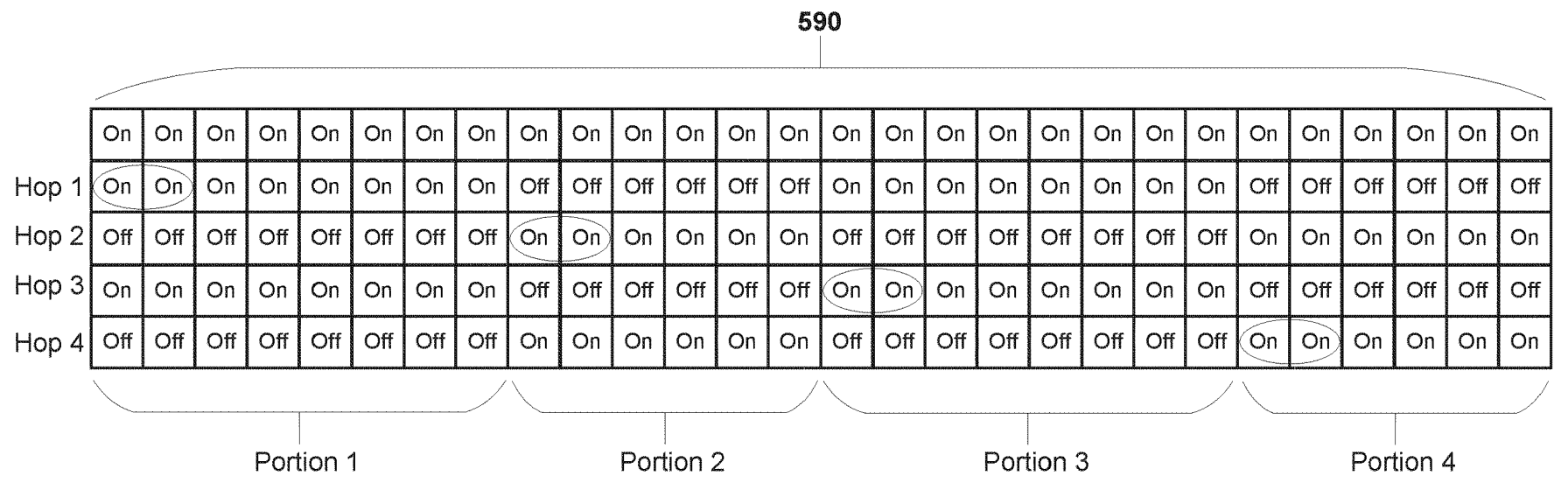

Supporting rapid forwarding of control information through multiple hops can be problematic (1) while fulfilling the unlicensed band regulatory rules with the channel access mechanism defined for NR-U operation (which do not allow to send PDCCH without LBT), and (2) while minimizing the need for type 1 Listen Before Talk (LBT) at the transmitter(s). There may be two techniques to allocate DU resources in IAB scenario. A first technique to allocate DU resources in IAB scenario is illustrated in FIGS. 4A and 4B and discussed in more detail below. The first technique can be a reasonable solution for managing DU soft resources (e.g., those resources which are conditionally available based on explicit or implicit signaling). A second technique to allocate DU resources in IAB scenario is illustrated in FIGS. 5A and 5B and discussed in more detail below.

FIGS. 4A and 4B illustrate time domain resource partitioning according to at least one example embodiment. FIG. 4A illustrates an example of the second technique that includes a donor node 425 that has a wired backhaul connection. The donor node 425 can serve a terminal device 445 and an access node 435, which can be an IAB node that does not have a wired backhaul connection. In this example implementation, the donor node 425 can perform type 1 LBT before the donor node 425 transmits downlink data/control via access link 430 to the terminal device 445 or downlink control/data via link 440 to the IAB node 435. The IAB node 435 can also perform type 1 LBT before the IAB node 435 transmits downlink data/control via link 450 to the terminal device 455. The terminal device 445 on the other hand can perform type 2 LBT before transmitting uplink data/control via access link 430 to the donor node 425. The terminal device 455 can also perform type 2 LBT before transmitting uplink data/control via link 450 to the IAB node 425. The IAB node 435 can perform type 2 LBT before transmitting uplink data/control via link 450 to the donor node 425. Other types of LBT (including also an option without LBT) could alternatively be used.

In the implementation illustrated by FIG. 4A the time domain resources can be divided into COT 1 460 and COT 2 465. This is illustrated by a time domain resource partitioning 475 used as a time structure for the COT. In the time domain resource partitioning 475 there can be one switch point between COT 1 460 and COT 2 465. However, in some other implementations, there could be multiple different switching points. The duration of the time domain resource partitioning 475, including COT 1 460 and COT 2 465, can be less than or equal to maximum channel occupancy time. Alternatively, the MCOT duration may be determined separately for COT 1 and COT 2. The starting time of the time domain resource partitioning can be defined by COT starting time. The COT starting time can be within a predefined (e.g., short) time interval after the last vacant channel measurement of LBT. In other words, the starting time of the time domain resource partitioning can depend on the preceding LBT, and the time between consecutive time domain resource partitioning's may be irregular. COT 1 460 can contain portions that are available to access link 430 transmissions and backhaul link 440 transmissions between the donor node 425 and the terminal device 445 and between the donor node 425 and the IAB node 435. The portions of COT 1 460 can be available such that downlink transmissions are scheduled first and after that uplink transmissions are scheduled. COT 2 465 can contain portions that are available to access link 430, 450 transmissions between the donor node 425 and the terminal device 445 and between the IAB node 435 and the terminal device 455. The portions of COT 2 465 can be available such that downlink transmissions can be scheduled first and after that uplink transmissions are scheduled.

In the example of FIG. 4A, the donor node 425 can allocate the resources for different links including, for example, links 430, 440 and 450 in both uplink and downlink directions. The donor node 425 may indicate the maximum allowed duration of COT 2 465 explicitly using, for example, Group Common-Physical Downlink Control Channel (GC-PDCCH) (e.g., DCI format 2_0). The donor node 425 may also indicate a portion configuration to be used during the COT 2 465 which may reduce the probability of cross-link interference occurring.

FIG. 4B illustrates another implementation. The implementation illustrated in FIG. 4B differs from the implementation illustrated in FIG. 4A in that the IAB node 435 can have a transmission link 485 to another access node 480 that does not have a wired backhaul connection. The transmission link 485 between the IAB node 435 and the access node 480 can enable a multi-hop extension possibility.

In the implementation illustrated in FIG. 4B, the donor node 425 indicates one or more portions 490 during which the transmission links 450 and 485 can have a discontinuous reception, DRX, opportunity, which may enable saving of energy. The indication of the one or more portions 490 can be first received by the IAB node 435, which then forward the indication to the terminal device 455 and the access node 480. In other words, during the time one or more portions 490 the terminal device 455 may not have to detect downlink transmission and the access node 480 may arrange the access link 495 to terminal device 457 during the one or more portions 490 without having to detect downlink 485 transmission. The one or more portions 490 do not limit the maximum duration of the COT 1 460.

In the example implementations of FIGS. 4A and 4B, the IAB node 435 can determine that not all the portions available to uplink via link 440 transmission within the COT 1 460 are needed. In such a situation the IAB node 435 may begin to perform LBT already before the boundary between the COT 1 460 and the COT 2 465. It is to be noted that the example embodiments mentioned above are compatible with any LBT enhancements such as beam domain starting with omni-LBT followed by a single-shot LBT in the beam domain, beam specific type 1 LBT followed by a single-shot omni-direction LBT or type 1 LBT constructed from a combination of beam-specific and omni-directional LBT measurements.

The second technique can be a solution for managing DU hard (or NA) resources (e.g., those resources which are semi-persistently available (or NA) based on higher layer configuration). As discussed above, an example implementation of the second technique may be that parent link(s) operate based on COT acquired by the parent node, and child link(s) based on COT acquired by IAB node, respectively.

FIGS. 5A and 5B illustrate example embodiments of a multi-hop scenario according to at least one example embodiment. FIG. 5A illustrates an example implementation of extending coverage of a communication system using multi-hop communication. In this implementation, the communication system can operate in an unlicensed frequency band and can utilize TDD. An access node can be a donor node 510 that has a wired backhaul connection. The access node 510 can be a gNB. In this implementation, the donor node 510 (a.k.a. donor gNB, or donor DU) can control (together with CU) a time domain resource partitioning of the multi-hop communication system and thereby also acts as a scheduling node. The donor node 510 can serve a terminal device 530 and link 515 exists between the donor node 510 and the terminal device 530. The donor node 510 can serve an access node 520 which is an IAB node that in the multi-hop scenario also schedules resources thereby acting also as a scheduling node. The scheduling node 520 can serve the terminal device 550 and the link 535 exists between them. The scheduling node 520 also serves another access node 540 and the link 545 exists between them. The access node 540 can be an IAB node that in the multi-hop scenario also schedules resources thereby acting also as a scheduling node. The scheduling node 540 can serve another access node 560 and the link 555 exists between them. The access node 560 can be an IAB node that in the multi-hop scenario also schedules resources thereby acting also as a scheduling node and serves a terminal device 570 and the link 565 exits between them.

The scheduling nodes 510-560 can be configured with two predefined patterns for time domain resource partitioning 475. The patterns can be defined to address the multi-hop scenario such that a first pattern defines resource usage for odd numbered hops that can be the links 525 and 555 and a second pattern defines resource usage for even numbered hops that can be the links 535, 545 and 565. The odd numbered hops may be links of a first category and the even numbered hops may be links of a second category. The first and the second pattern can include portions that can define a resource available for uplink or downlink transmission in the corresponding links. Consecutive portions can be available for a pattern and compose a block of portions. In an alternative (or additional) example, slots or mini slots could be used to define resources available for transmission. The time domain resource partitioning can be defined by the first and the second pattern such that the odd numbered hops and the even numbered hops do not have resources available simultaneously thereby following the constrains of half-duplex characteristics of time-division multiplexing, TDM. Due to the scheduling introduced by the first and the second pattern, a scheduling node may not have to be prepared for backhaul communication while transmission is active for its access link. FIG. 5A can illustrate how the even and odd numbered hops may not be on simultaneously. In other words, the resources may not be available simultaneously.

In some example embodiments, the DU functionality of the IAB node may determine that resources denoted as off for the child links may not be as used schedulable resources for the child links. Additionally, or alternatively, the MT functionality of the IAB node may determine off resources as flexible resources not used or scheduled for a parent backhaul link by a serving DU or donor gNB.

In some implementations, the DU functionality of the IAB node may determine that resources indicated as on can be used as scheduled schedulable resources for the child links. Additionally, or alternatively, the MT functionality of the IAB node may determine on resources as resources available for parent backhaul link according to scheduling by a serving IAB node/donor gNB. In order to follow the LBT scenario, each scheduling node 510-560 can perform a type 1 LBT before acquiring a channel and initiating downlink transmission. Due to the LBT, the starting time of a COT can depend on the success of the performed LBT. Hence time interval between the starting times of consecutive COTs (of the same link and link direction) may vary. The ending of the COT can depend on the scheduling determined by the scheduling node provided that the maximum COT allocation or the end of corresponding block of portions is not violated. Each scheduling node 510-560 can be responsible for the resource allocation between uplink and downlink transmission during its COT while the donor node 510 remains responsible for the overall time domain resource partitioning.

A COT can begin with one or more portions available for downlink transmission (DL) as is illustrated in the time domain resource partitioning 580 FIG. 5A. Alternatively, the COT may begin with one or more portions available for uplink transmission (UL). The scheduling node may send resource allocation information indicating that the COT beings with one or more portions available for uplink transmission using a group common physical downlink control channel, GC-PDCCH. In an example in which it is not known if the COT begins with one or more portions available for uplink or downlink transmission, the receiving party, a terminal device or an access node, may begin in parallel reception of physical downlink shared channel, PDSCH and LBT (based on energy detection for example) while processing the resource allocation information received from the GC-PDCCH. In case the COT does not start with one or more portions available for downlink transmission, the LBT necessary for the uplink transmission is thereby already initiated. As the COT is started with uplink transmission, it may be necessary to perform type 1 LBT before the uplink transmission.

The COT may begin with one or more portions allocated to downlink transmission, but the scheduling node may not have data for downlink transmission. In such a case, the portion(s) available for downlink transmission are kept to minimal thereby maximising the amount of resources available for the uplink transmission. The scheduling node may indicate the duration of the one or more portions allocated to downlink transmission and the duration of the one or more portions allocated to uplink transmission using a group common physical downlink control channel, GC-PDCCH.

Utilizing higher layer signaling to indicate a split between portions available for downlink (DL) and uplink (UL) transmission may be possible. An advantage that may be achieved is reduction in cross-link interference. If this approach is to be used, each scheduling node 510-560 may follow the splits between portions available for downlink (DL) and uplink (UL) transmission when scheduling downlink and uplink transmission within its COT. The splits between portions available for downlink (DL) and uplink (UL) transmission may be configured in addition to the splits between the first and the second pattern. It is to be noted that the maximum duration of single COT is to be less than or equal to the maximum channel occupancy time.

In some example embodiments, a scheduling node can acquire a channel by performing a type 1 LBT and initiating a downlink transmission. The scheduling node can use the COT for downlink transmission. The scheduling node may send resource allocation information to a terminal device or an access node to acquire a separate COT for uplink transmission. The terminal device or the access node may then acquire a channel by performing a type 1 LBT and uses COT for uplink transmission. The ending of the COT can depend on the uplink scheduling determined by the scheduling node and is confined within the block of portions according to the corresponding pattern.

FIG. 5B illustrates an example implementation in which the first and the second patterns may be dynamically reconfigured. In this implementation, the time domain resource partitioning 590 that includes predefined splits for between the odd and even numbered hops. The first and second patterns can define on and off times for the odd and even numbered hops such that resources may not allocated simultaneously to odd and even numbered hops. A donor node with a wired backhaul connection can be configured to determine that a time domain resource partitioning can be dynamically re-configured such that the first and the second patterns are modified. The donor node can inform scheduling nodes regarding the dynamic modification. Four (4) hops are shown and thereby 4 scheduling nodes should be informed. The donor node may need to take into account that all the scheduling nodes need to have the information before the dynamic modification is to take place because of the number of hops. Therefore, the information regarding the dynamic modification can include the starting time of the modified configuration as well as the modifications to the first and the second pattern. The information may be transmitted using, for example, a bitmap or an index for a list of higher layer configured patterns. The information may be transmitted using layer 1 (L1) control signaling, such as GC-PDCCH, MAC or higher layer signaling such as RRC. In some implementations, the scheduling node may acknowledge that the scheduling node has received the information.

The information regarding the dynamic modifications can be propagated in the multi-hop chain. In this implementation, there are 4 various portions and in each portion the information can have propagated one hop in the multi-hop chain. The information indicating the dynamic modification is illustrated in FIG. 5B by circulating portions of the patterns. The abovementioned implementations can be compatible with any LBT enhancements such as beam domain starting with omni-LBT followed by a single-shot LBT in the beam domain, beam specific type 1 LBT followed by a single-shot omni-direction LBT or type 1 LBT constructed from a combination of beam-specific and omni-directional LBT measurements.

Further, a COT may include multiple switching points between portions available for downlink transmission and portions available for uplink transmission, which may provide improved latency performance without increasing overhead of frequent channel access procedures unreasonably. If multiple switching points are used in within a COT, channel access procedures may take that into account. A scheduling node may perform type 1 LBT at the beginning of the COT and an IAB node performing uplink transmission to the scheduling node may perform type 2 LBT, or alternatively do not perform any LBT, at the beginning of the portion available for the uplink transmission. In an example with at least two switching points, scheduling nodes may perform type 2 LBT, or alternatively do not perform any LBT, before the second downlink transmission.

The problem of the second technique (as discussed above with regard to FIGS. 5A and 5B) can be that the approach can take an undesirable (e.g., more than that is desirable) amount of time to receive critical control information from hop (n), before it can be forwarded in hop (n+1). There may be two alternatives, (1) Normal operation: COT 1, COT 2 defined based on regulatory limits that can result in a large delay but smaller overhead due to LBT and DL/UL switching, and (2) shortened COT 1, COT 2 that can result in a smaller delay but larger overhead due to LBT and DL/UL switching (furthermore, there may be a risk to lose the channel when shortening the COT).

Example embodiments relate to providing an opportunity for an integrated access and backhaul (IAB) node to transmit (and/or receive) data (e.g., control data) via a child link during (e.g., not just after) the channel occupancy time (COT) acquired by the parent IAB node. In an example implementation, a framework for COT sharing in an IAB scenario, for example, between a parent node distributed unit (DU) and IAB node DU, is provided. The steps can be briefly described in relation to FIG. 9. This example assumes that the timing of a parent DU 905 (Tx) and an IAB node DU 920 (Tx) is aligned. However, other timings are within the scope of this disclosure. For example, a timing offset between parent DU Tx, and IAB node Tx can be included. Depending on the propagation delay, cyclic prefix (CP) prolonging may be needed for IAB node DU 920 (e.g., in order to align the DU Tx timing with listen before talk (LBT) time period (e.g., DU LBT 915)). This can be done, for example, e.g., by use of CP prolonging (alignment period) 935.

In a first step, the parent DU 905 can acquire a COT (e.g., the illustrated data structure) based on, for example, a Type 1 LBT procedure. In a second step, the parent DU 905 starts the DL transmission. During the transmission, the parent DU 905 can convey an indication (e.g., a first indication) to IAB node MT 910 (implicitly or explicitly) that the COT has been acquired. The IAB node MT 910 can perform DL burst detection. The DL burst detection can be based on PDCCH monitoring and/or DMRS detection. In a third step, the parent DU 905 can convey a second indication to the IAB node MT 910 that the DU acquired COT is paused (e.g., a time gap 925) for time period (e.g., 25 us) and the IAB node MT 910 link is NULL for a time period 940 right after the time gap 925 pause. The IAB node MT 910 can perform LBT for DU link during the time gap 925. The time period 940 can be pre-configured number of symbols (e.g., two OFDM symbols). The second indication may contain information on the available frequency domain resources (for DU) during time period 940.

Figure 9:
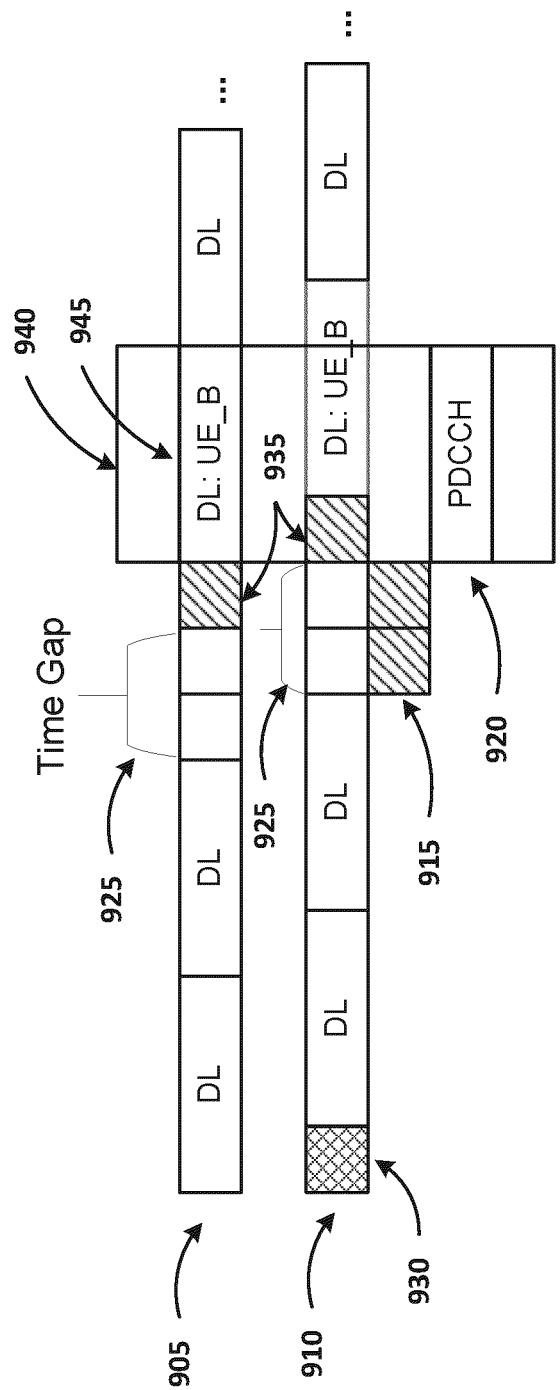
FIG. 9 illustrates allocating resources within a communication system according to at least one example embodiment.

In a fourth step, during the time period 940, based on, for example, the LBT outcome, IAB node DU 920 may transmit critical control signal(s) such as PDCCH indicating the COT structure via the DU child link. In order to ensure that parent DU does not lose the acquired COT, the parent DU 905 can transmit signals for another UE(s)/MT(s) at this time (e.g., PDCCH). Alternatively or additionally, at this time the parent DU 905 can transmit a reservation signal (without any recipient). This transmission may be frequency domain multiplexed with resources used by the IAB node DU 920 (while avoiding interference among parent and child links). PDCCH can include useful information (e.g., DCI Format 2_0 for the other UE(s)). In Europe, the IAB node may use Short Control Signaling (SCS) clause. SCS is defined in ETSI EN 301 893 which defines a harmonized standard fulfilling European regulations. In SCS, equipment is allowed to access channel without LBT up to 50 times in 50 ms with overall transmission duration less than 2.5 ms per 50 ms. Therefore, step 4 could be skipped in Europe. As shown in FIG. 9, the IAB node MT 910 COT can have a slot 930 representing a propagation delay, the parent DU 905 can have a slot 935 representing a CP prolonging. Slot 945 indicates that the target node is different (e.g., UE_B), instead of the IAB node.

Figure 12:
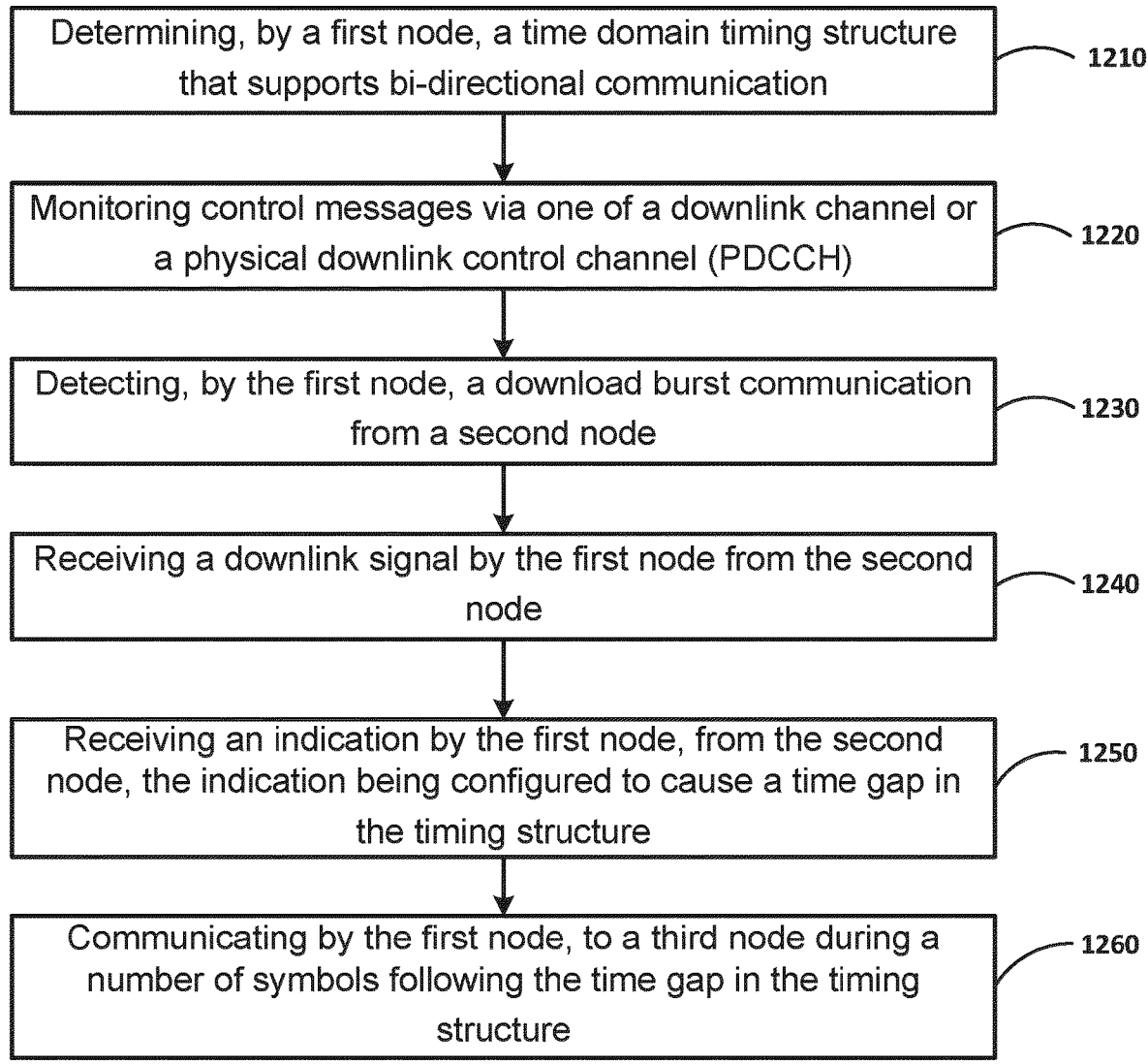
FIG. 12 illustrates a block diagram of a method according to at least one example implementation.
Figure 13:
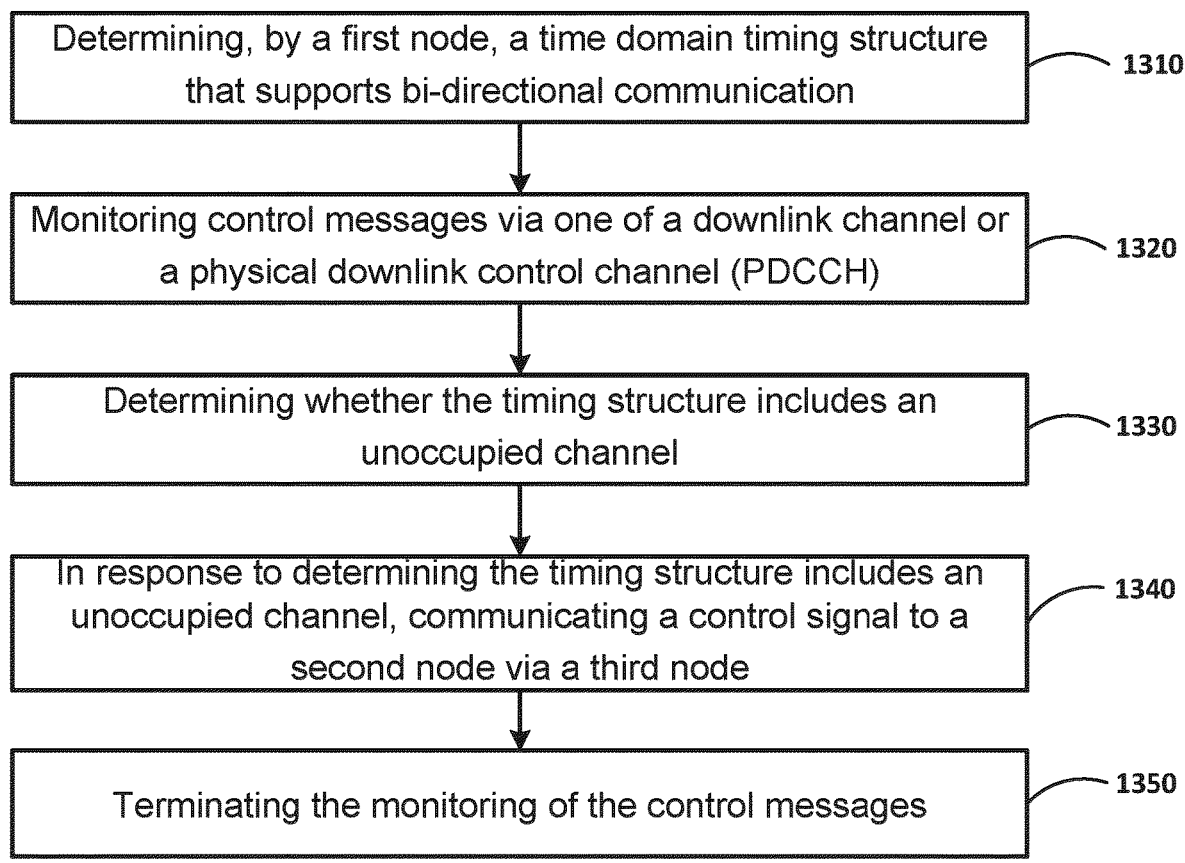
FIG. 13 illustrates a block diagram of a method according to at least one example implementation.
Figure 14:
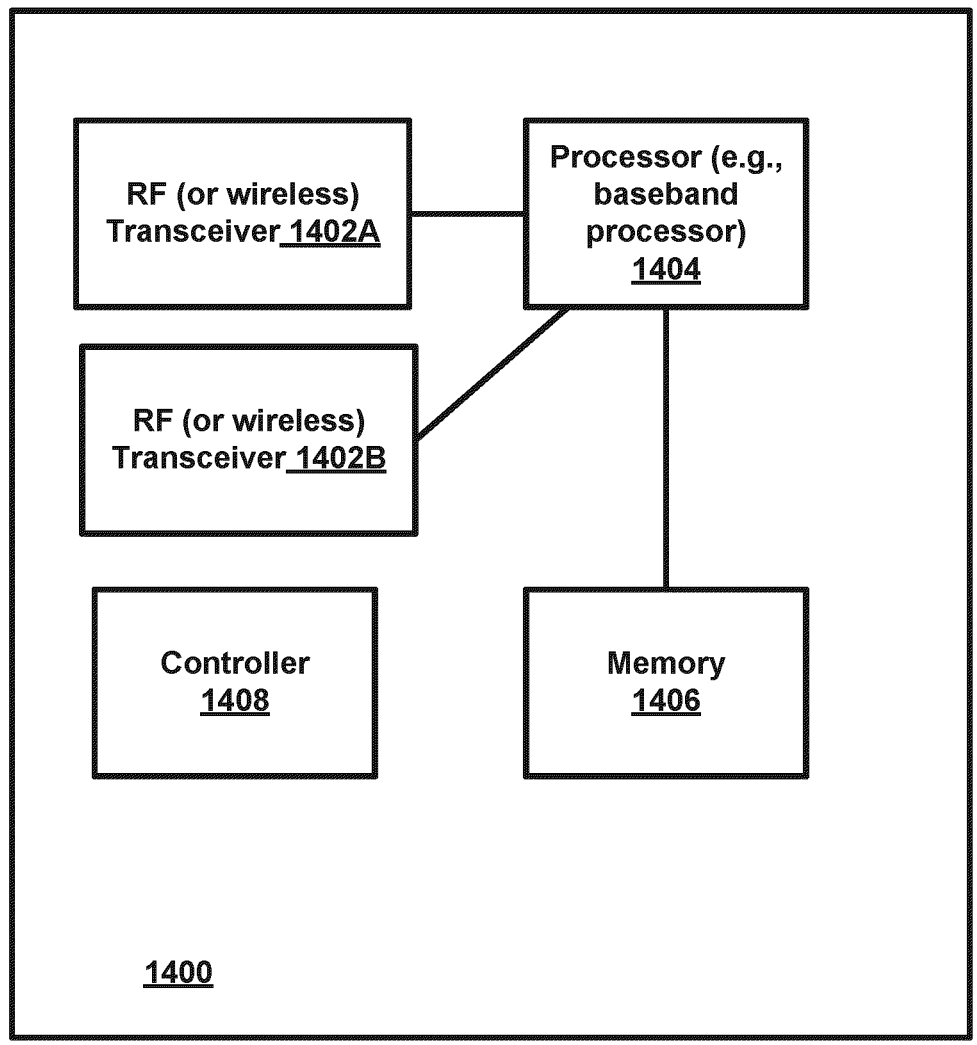
FIG. 14 is a block diagram of a wireless station or wireless node (e.g., AP, BS, gNB, RAN node, relay node, UE or user device, network node, network entity, DU, CU-CP, CU-CP, . . . or other node) according to an example embodiment.

FIGS. 6, 7, 8, 11, 12 and 13 illustrates a block diagram of a method according to at least one example embodiment. The steps described with regard to FIGS. 6, 7, 8, 11, 12 and 13 may be performed due to the execution of software code stored in a memory associated with an apparatus (e.g., as shown in FIG. 14) and executed by at least one processor (e.g., at least one processor) associated with the apparatus. However, alternative embodiments are contemplated such as a system embodied as a special purpose processor. Although the steps described below are described as being executed by a processor, the steps are not necessarily executed by the same processor. In other words, at least one processor may execute the steps described below with regards to FIGS. 6, 7, 8, 11, 12 and 13.

In an example implementation, conveying a slot format indication using DCI Format 2_0 (SFI) and/or DCI Format 4_0 (Availability info) can include: both a parent node and an IAB node (DU) perform type 1 LBT. However, the IAB node (DU) may not fully complete type 1 LBT. Instead, the IAB node (DU) can enter self-deferral; the IAB node becomes aware of the COT structure (both MT and DU); and the IAB (DU) can create a COT structure information based on the received COT structure and can transmit the COT structure information during an unoccupied COT slot in a mobile terminal (MT) channel herein after referred to as MT NULL. The IAB node (DU) may use existing signaling schemes for control signaling which can ensure backward compatibility.

Figure 6:
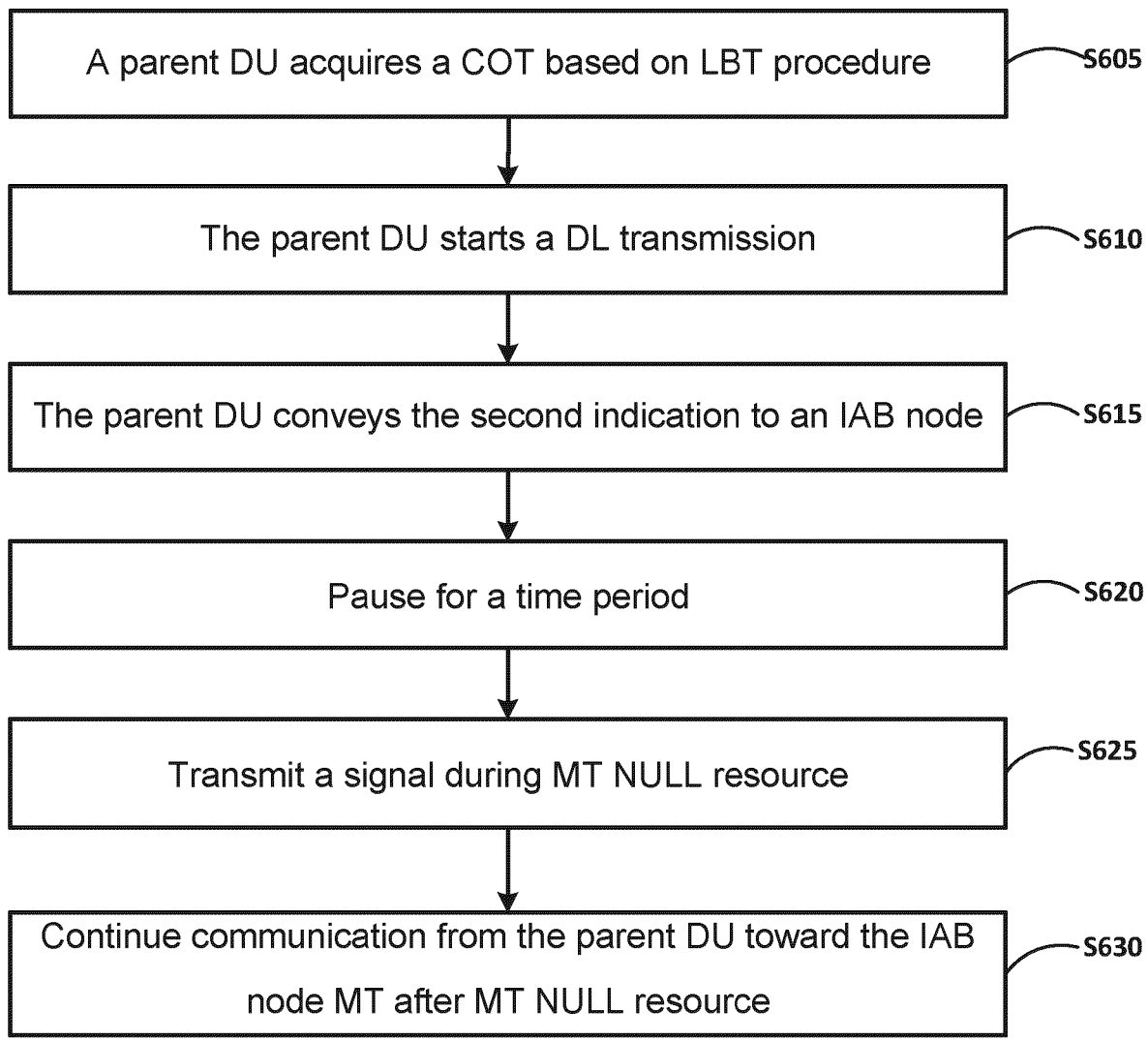
FIG. 6 illustrates a block diagram of a method for a parent node according to at least one example implementation.

FIG. 6 illustrates a flowchart for communicating data by a parent node according to at least one example implementation. As shown in FIG. 6, in step S605 a COT based on an LBT procedure is acquired by a parent DU. For example, the parent DU (e.g., donor node 510) can perform type 1 LBT for the DU link and enter self-deferral. Therefore, the COT (e.g., the parent DU 905 COT) can be based on a type 1 LBT procedure.

In step S610 a DL transmission is started by the parent DU. For example, the parent DU (e.g., donor node 510) can begin a DL transmission using the COT (e.g., the parent DU 905 COT). The MT can perform a DL burst detection and start receiving the DL signal. As part of the transmission, the parent DU can convey an indication (e.g., a first indication) to the IAB node (implicitly or explicitly) that the COT has been acquired. The IAB node can perform DL burst detection. This can be based on PDCCH monitoring and/or DMRS detection.

In step S615 a second indication is conveyed to the IAB node (e.g., IAB (MT)) by the parent DU. The second indication can be that the parent DU acquired COT is paused for a time period (e.g., time gap 925, e.g., a 25 us time period) and a MT link has a NULL resource for a time period (e.g., time period 940) after (e.g., directly after) the pause (e.g., time gap 925). The IAB node can perform LBT (e.g., DU LBT 915) for DU link during the time period 940. The time period can be pre-configured (e.g., two OFDM symbols). The second indication may contain information on the available frequency domain resources (e.g., for the DU).

In step S620 COT is paused for the time period. For example (as also discussed below regarding steps to S810, S815, and S820), the DU can perform the last pending LBT CCA (ending self-deferral) during the time period (e.g., time gap 925, e.g., 25 us). Based on the LBT outcome, IAB node DU may transmit critical control signal(s) such as PDCCH indicating the COT structure via the DU child link during the time period (e.g., time period 940) when the MT link has a NULL resource.

In step S625 a signal is transmitted during MT NULL resource. The signal can be transmitted towards other UEs/MTs. The first symbol during the MT NULL resource can be created using a CP extension. For example, in order to ensure that parent DU does not lose the acquired COT, the parent DU can transmit a signal for another UE(s)/MT(s). This transmission may be frequency division multiplexed with resources used by the IAB node. The transmission, for example, PDCCH, can include useful information (e.g., DCI Format 2_0 for the other UE(s)).

In step S630 the parent DU continues communication toward the IAB node MT after MT NULL resource. For example, the parent DU can transmit/receive via parent acquired COT (according to scheduling based on Parent node).

Figure 7:
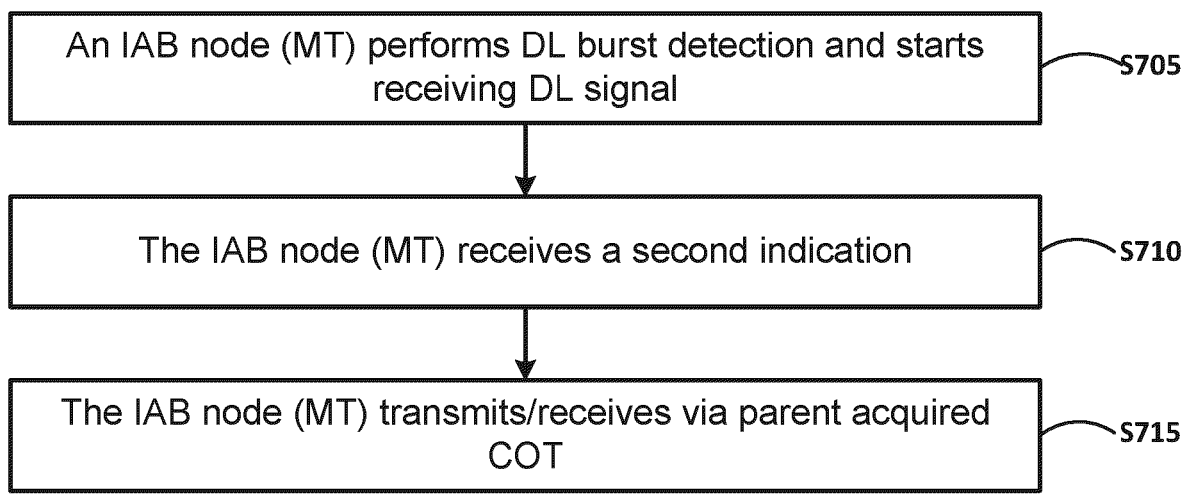
FIG. 7 illustrates a block diagram of a method for an IAB node according to at least one example implementation.

FIG. 7 illustrates a block diagram of a method for an IAB node according to at least one example implementation. As shown in FIG. 7, in step S705 an IAB node (MT) performs DL burst detection and starts receiving a DL signal.

In step S710 the IAB node (MT) receives a second indication. For example, a first indication can be an indication that the COT has been acquired. The second indication can be a time gap (e.g., a 25 us time gap) and a time period during which MT has NULL resource.

In step S715 the IAB node (MT) transmits/receives via parent acquired COT. The IAB node (MT) can transmit/receive according to scheduling based on the parent node.

Figure 8:
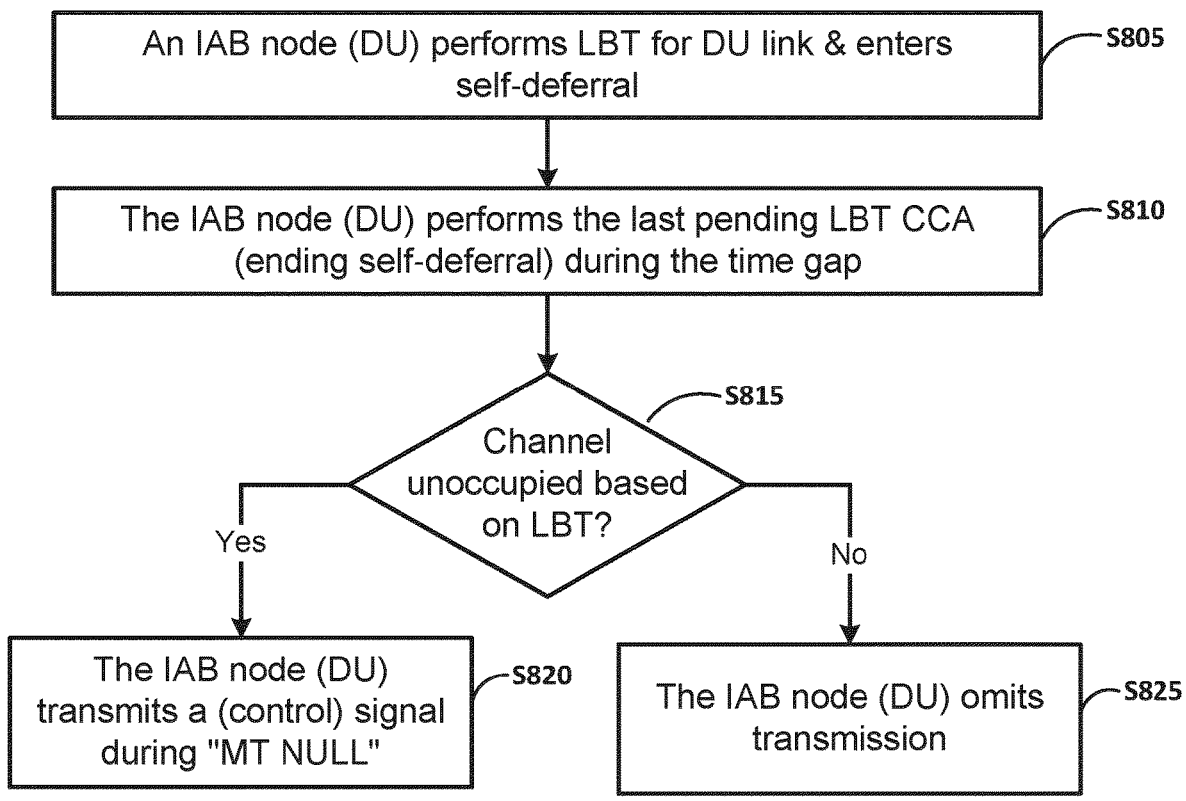
FIG. 8 illustrates a block diagram of a method for an IAB node according to at least one example implementation.

FIG. 8 illustrates a block diagram of a method for an IAB node according to at least one example implementation. According to example implementations, an IAB node may implement both FIG. 7 (for MT functionalities) and FIG. 8 (for DU functionalities). As shown in FIG. 8, is step S805 an IAB node (DU) performs LBT for DU link and enters self-deferral. The LBT can be type 1 LBT.

In at least one example implementation, the timing of steps S810, S815, and S820 can be given by the second indication received in step S710 of FIG. 7 above. In step S810 the IAB node (DU) performs the last pending LBT clear channel assessment (CCA) during the time gap (e.g., a 25 us time gap). Performing the last pending LBT CCA can end self-deferral.

In step S815 the IAB node (DU) determines whether a channel is unoccupied based on LBT. In response to determining the channel is unoccupied, in step S820, the IAB node (DU) transmits a (control) signal during MT NULL resource. In response to determining the channel is occupied, in step S825, the IAB node (DU) omits transmission.

Figure 10:
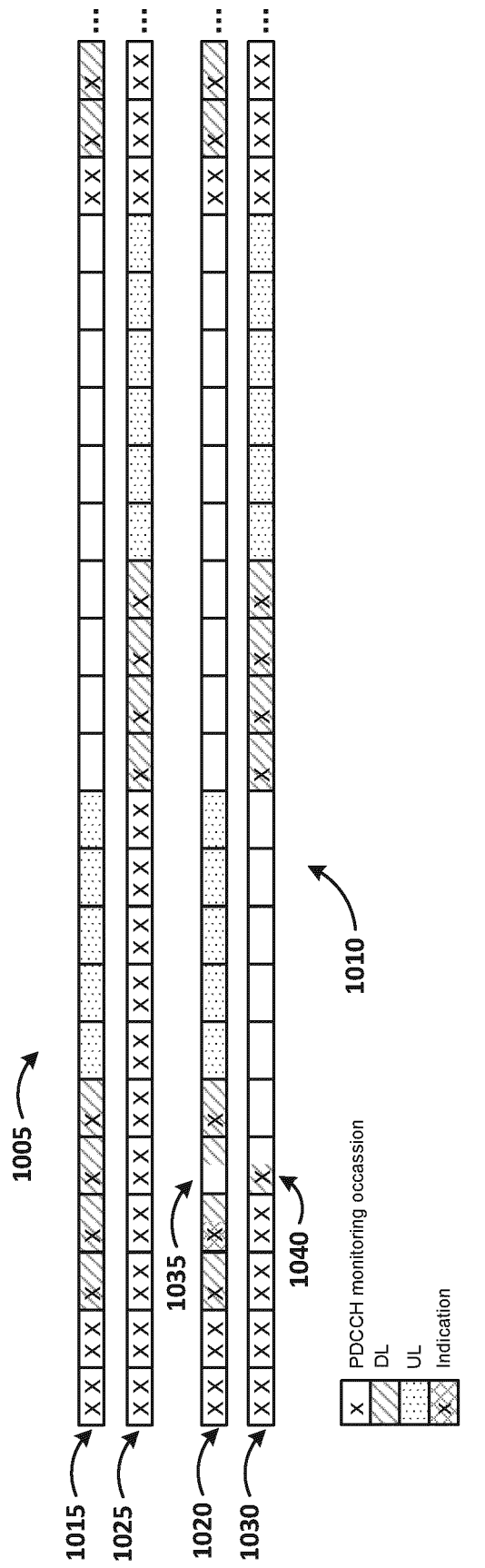
FIG. 10 illustrates allocating resources within a communication system according to at least one example embodiment.

FIG. 10 illustrates allocating resources within a communication system according to at least one example embodiment. As shown in FIG. 10, a first COT structure 1005 can include an IAB node MT connected to parent COT 1015 and a UE connected to DU COT 1025. A second COT structure 1010 can include an IAB node MT connected to parent COT 1020 and a UE connected to DU COT 1030. The parent COT 1020 can include a time gap and MT link NULL resource 1035 (e.g., indicated by a second indication). The DU COT 1030 can include PDCCH 1040 (e.g., during a MT link NULL). The first COT structure 1005 can show a standard communication. The second COT structure 1010 can show communication according to at least one example implementation. In the absence of COT structure information, both MT and UE can perform PDCCH monitoring once per 7 OFDM symbols (e.g., PDCCH monitoring according to Search Space group #1). In response to detecting a COT or PDCCH in 1040, the monitoring can be performed once/in one slot during DL portion (e.g., PDCCH monitoring according to Search Space group #2).

Example implementations can allow/enable forwarding the COT structure from the parent node to the grand-child node during the parent acquired COT. Forwarding the COT structure from the parent node to the grand-child node can enable relaxed (e.g., reduced) PDCCH monitoring at the grand-child node.

Some Example Implementations

Figure 11:
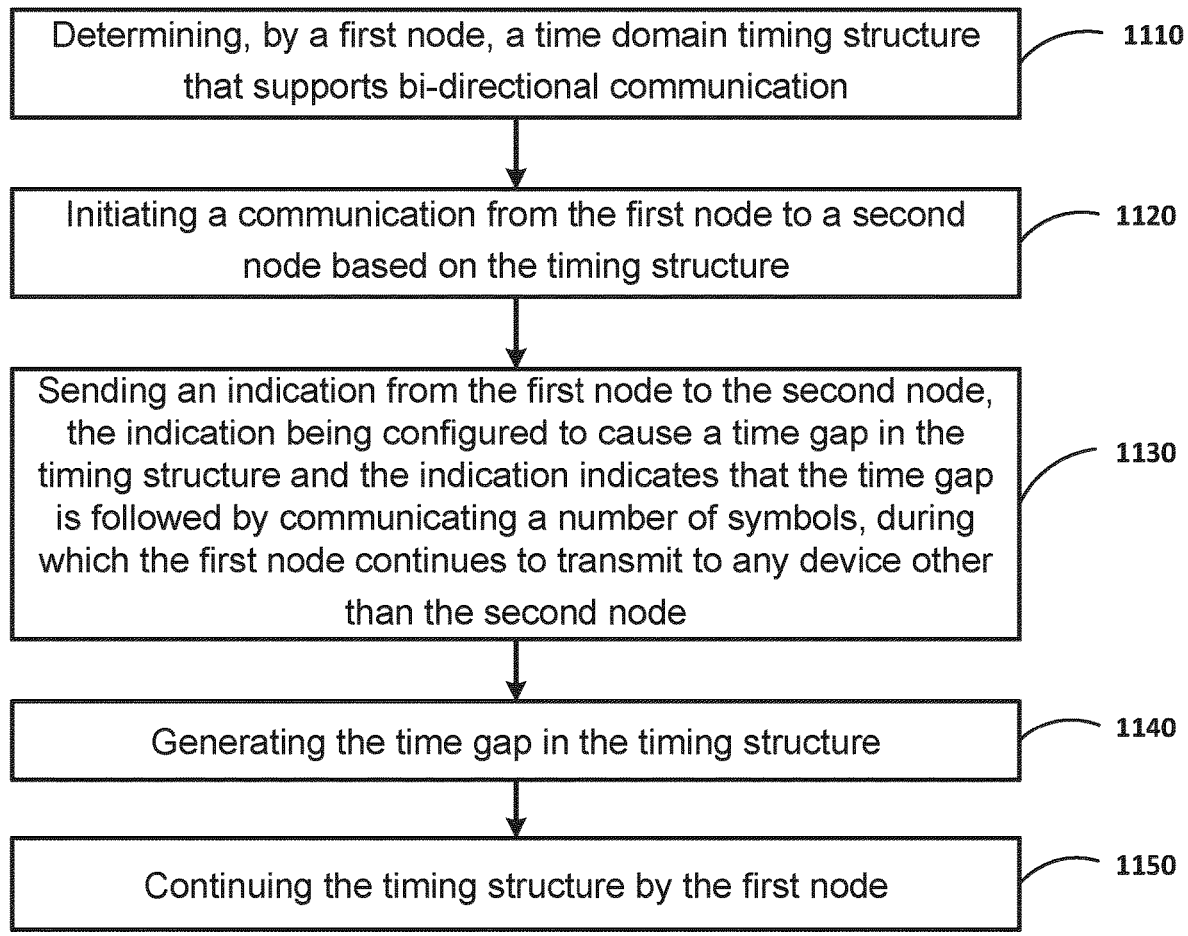
FIG. 11 illustrates a block diagram of a method according to at least one example implementation.

Example 1. FIG. 11 is a flowchart illustrating a method according to an example implementation. Operation 1110 includes determining, by a first node, a time domain timing structure that supports bi-directional communication. Operation 1120 includes initiating a communication from the first node to a second node based on the timing structure. Operation 1130 includes sending an indication from the first node to the second node, the indication being configured to cause a time gap in the timing structure and the indication indicates that the time gap is followed by communicating a number of symbols, during which the first node continues to transmit to any device other than the second node. Operation 1140 includes generating the time gap in the timing structure. Operation 1150 includes continuing the timing structure by the first node.

Example 2. The method of Example 1, wherein the first node can be a parent node, the second node can be a child node, and the third node can be a grand-child node.

Example 3. The method of Example 1 and Example 2, wherein the second node can be an IAB node.

Example 4. The method of any of Example 1 to Example 3, wherein during the communication of the number of symbols, a first node transmission can be restricted to a subset of frequency domain resources.

Example 5. The method of any of Example 1 to Example 4, wherein the third node can be a user equipment or an IAB node.

Example 6. The method of any of Example 1 to Example 5, wherein the first node, the second node, and the third node can be configured to operate in an unlicensed frequency band.

Example 7. The method of any of Example 1 to Example 6, wherein the time domain timing structure can be a channel occupancy time structure.

Example 8. The method of any of Example 1 to Example 7, wherein the time domain timing structure can include at least a first pattern and a second pattern, the first pattern can include a first number of portions allocated to at least one of an uplink transmission and a downlink transmission, the first pattern can be associated with a first link category, the second pattern can include a second number of portions allocated to at least one of an uplink transmission, and a downlink transmission, and the second pattern can be associated with a second link category.

Example 9. The method of any of Example 1 to Example 8, wherein steps of Example 1 can occur during one pattern.

Example 10. The method of any of Example 1 to Example 9, wherein the indication can identify the time gap in the timing structure.

Example 11. The method of Example 10, wherein the time gap can be a listen before talk (LBT) time gap.

Example 12. The method of Example 10 and Example 11, wherein the time gap can be 25 µs.

Example 13. The method of any of Example 1 to Example 12, wherein the indication further indicates time domain resources allocated for the second node can be used for transmitting a second indication after the time gap.

Example 14. The method of any of Example 1 to Example 13, further comprising communicating a signal from the first node to the device via the second node.

Example 15. FIG. 12 is a flowchart illustrating a method according to an example implementation. Operation 1210 includes determining, by a first node, a time domain timing structure that supports bi-directional communication. Operation 1220 includes monitoring control messages via one of a downlink channel or a physical downlink control channel (PDCCH). Operation 1230 includes detecting, by the first node, a download burst communication from a second node. Operation 1240 includes receiving a downlink signal by the first node from the second node. Operation 1250 includes receiving an indication by the first node, from the second node, the indication being configured to cause a time gap in the timing structure. Operation 1260 includes communicating by the first node, to a third node during a number of symbols following the time gap in the timing structure.

Example 16. The method of Example 15, wherein the first node can be a child node, the second node can be a parent node, and the third node can be a grand-child node.

Example 17. The method of Example 15 and Example 16, wherein the first node and the third node can comprise distributed units.

Example 18. The method of any of Example 15 to Example 17, wherein the first node and the third node can be integrated access and backhaul nodes.

Example 19. The method of any of Example 15 to Example 18, wherein the third node can be a mobile terminal.

Example 20. The method of any of Example 15 to Example 19, wherein the third node can be a user equipment.

Example 21. The method of any of Example 15 to Example 20, wherein the first node, the second node, and the third node can be configured to operate in an unlicensed frequency band.

Example 22. The method of any of Example 15 to Example 21, wherein the time domain timing structure can be a channel occupancy time structure.

Example 23. The method of any of Example 15 to Example 22, wherein the time domain timing structure can include at least a first pattern and a second pattern, the first pattern can include a first number of portions allocated to at least one of an uplink transmission and a downlink transmission, the first pattern can be associated with a first link category, the second pattern can include a second number of portions allocated to at least one of an uplink transmission and a downlink transmission, and the second pattern can be associated with a second link category.

Example 24. The method of any of Example 15 to Example 23, wherein the indication can identify the time gap in the timing structure.

Example 25. The method of Example 24, wherein the time gap can be a listen before talk (LBT) time gap.

Example 26. The method of Example 25 and Example 26, wherein the time gap is 25 µs.

Example 27. The method of any of Example 15 to Example 26, can further comprise receiving, by the first node, from the second node, a communication including the signal.

Example 28. FIG. 13 is a flowchart illustrating a method according to an example implementation. Operation 1310 includes determining, by a first node, a time domain timing structure that supports bi-directional communication. Operation 1320 includes monitoring control messages via one of a downlink channel or a physical downlink control channel (PDCCH). Operation 1330 includes determining whether the timing structure includes an unoccupied channel. Operation 1340 includes in response to determining the timing structure includes an unoccupied channel, communicating a control signal to a second node via a third node. Operation 1350 includes terminating the monitoring of the control messages.

Example 29. The method of Example 28, wherein the first node can be a grand-child node, the second node can be a parent node, and the third node can be a child node.

Example 30. The method of Example 28 and Example 29, wherein the first node and the third node are distributed units.

Example 31. The method of any of Example 28 to Example 30, wherein the first node and the third node can be integrated access and backhaul nodes.

Example 32. The method of any of Example 28 to Example 31, wherein the first node can be a mobile terminal.

Example 33. The method of any of Example 28 to Example 32, wherein the first node can be a user equipment.

Example 34. The method of any of Example 28 to Example 33, wherein the first node, the second node, and the third node can be configured to operate in an unlicensed frequency band.

Example 35. The method of any of Example 28 to Example 34, wherein the time domain timing structure can be a channel occupancy time structure.

Example 36. The method of any of Example 28 to Example 35, wherein the time domain timing structure can include at least a first pattern and a second pattern, the first pattern can include a first number of portions allocated to at least one of an uplink transmission and a downlink transmission, the first pattern can be associated with a first link category, the second pattern can include a second number of portions allocated to at least one of an uplink transmission and a downlink transmission, and the second pattern can be associated with a second link category.

Example 37. The method of any of Example 28 to Example 36, wherein the determining of whether the timing structure can include an unoccupied channel uses a listen before talk (LBT) technique.

Example 38. A non-transitory computer-readable storage medium comprising instructions stored thereon that, when executed by at least one processor, are configured to cause a computing system to perform the method of any of Examples 1-37.

Example 39. An apparatus comprising means for performing the method of any of Examples 1-37.

Example 40. An apparatus comprising: at least one processor; and at least one memory including computer program code; the at least one memory and the computer program code configured to, with the at least one processor, cause the apparatus at least to perform the method of any of Examples 1-37.

FIG. 14 is a block diagram of a wireless station 1400 or wireless node or network node 1400 according to an example embodiment. The wireless node or wireless station or network node 1400 may include, e.g., one or more of an AP, BS, gNB, RAN node, relay node, UE or user device, network node, network entity, DU, CU-CP, CU-CP, . . . or other node) according to an example embodiment.

The wireless station 1400 may include, for example, one or more (e.g., two as shown in FIG. 14) RF (radio frequency) or wireless transceivers 1402A, 1402B, where each wireless transceiver includes a transmitter to transmit signals and a receiver to receive signals. The wireless station also includes a processor or control unit/entity (controller) 1404 to execute instructions or software and control transmission and receptions of signals, and a memory 1406 to store data and/or instructions.

Processor 1404 may also make decisions or determinations, generate frames, packets or messages for transmission, decode received frames or messages for further processing, and other tasks or functions described herein. Processor 1404, which may be a baseband processor, for example, may generate messages, packets, frames or other signals for transmission via wireless transceiver 1402 (1402A or 1402B). Processor 1404 may control transmission of signals or messages over a wireless network, and may control the reception of signals or messages, etc., via a wireless network (e.g., after being down-converted by wireless transceiver 1402, for example). Processor 1404 may be programmable and capable of executing software or other instructions stored in memory or on other computer media to perform the various tasks and functions described above, such as one or more of the tasks or methods described above. Processor 1404 may be (or may include), for example, hardware, programmable logic, a programmable processor that executes software or firmware, and/or any combination of these. Using other terminology, processor 1404 and transceiver 1402 together may be considered as a wireless transmitter/receiver system, for example.

In addition, referring to FIG. 14, a controller (or processor) 1408 may execute software and instructions, and may provide overall control for the station 1400, and may provide control for other systems not shown in FIG. 14, such as controlling input/output devices (e.g., display, keypad), and/or may execute software for one or more applications that may be provided on wireless station 1400, such as, for example, an email program, audio/video applications, a word processor, a Voice over IP application, or other application or software.

In addition, a storage medium may be provided that includes stored instructions, which when executed by a controller or processor may result in the processor 1404, or other controller or processor, performing one or more of the functions or tasks described above.

According to another example embodiment, RF or wireless transceiver(s) 1402A/1402B may receive signals or data and/or transmit or send signals or data. Processor 1404 (and possibly transceivers 1402A/1402B) may control the RF or wireless transceiver 1402A or 1402B to receive, send, broadcast or transmit signals or data.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:

at least one processor; and at least one memory including computer program code;

the at least one memory and the computer program code configured to, with the at least one processor, cause the apparatus at least to:

determine, by a first node, a time domain timing structure that supports bi-directional communication, wherein the time domain timing structure is a channel occupancy time (COT) structure, wherein the time domain timing structure includes at least a first pattern and a second pattern, wherein the first pattern includes a first number of portions allocated to at least one of an uplink transmission and a downlink transmission, wherein the first pattern is associated with a first link category, the first link category being odd numbered hops, wherein the second pattern includes a second number of portions allocated to at least one of an uplink transmission and a downlink transmission, and wherein the second pattern is associated with a second link category, the second link category being even numbered hops;

initiate a communication from the first node to a second node based on the time domain timing structure;

send an indication from the first node to the second node, the indication being configured to cause a time gap in the time domain timing structure and the indication indicates that the time gap is followed by communicating a number of symbols, during which the first node continues to transmit to a user equipment, wherein the indication comprises group-common physical downlink control channel (PDCCH) signaling including a downlink control information (DCI) format configured to convey slot format, availability, or time domain timing structure information including at least a time gap and frequency-domain resources, wherein during the communication of the number of symbols, a first node transmission is restricted to a subset of frequency domain resources, wherein the indication identifies the time gap in the time domain timing structure, wherein the time gap is a listen before talk (LBT) time gap, wherein the time gap is 25 μs, and wherein the indication further indicates time domain resources allocated for the second node, and the resources are used for transmitting a second indication after the time gap;

generate the time gap in the time domain timing structure;

continue the time domain timing structure by the first node; and communicate a signal from the first node to the user equipment via the second node, wherein the first node, the second node, and the user equipment are configured to operate in an unlicensed frequency band, wherein the first node is parent distributed unit (DU) that has acquired the COT using Type-1 LBT and maintains the acquired COT by transmitting a reservation signal and a PDCCH toward another UE during the number of symbols, wherein the second node is an integrated access and backhaul (IAB) node comprising a mobile termination (MT) and performs a final clear-channel assessment during the time gap and then transmits control signaling during an MT-link NULL resource immediately following the time gap, and wherein cyclic-prefix prolonging is applied to align DU transmission with the LBT time gap.

* * * * *